United States Patent
Fujiwara

(10) Patent No.: US 8,144,189 B2
(45) Date of Patent: Mar. 27, 2012

(54) IMAGE ACQUISITION APPARATUS

(75) Inventor: Masaki Fujiwara, Osaka (JP)

(73) Assignee: Keyence Corporation, Osaka (JP)

( * ) Notice: Subject to any disclaimer, the term of this patent is extended or adjusted under 35 U.S.C. 154(b) by 965 days.

(21) Appl. No.: 12/133,861

(22) Filed: Jun. 5, 2008

(65) Prior Publication Data
US 2009/0002485 A1 Jan. 1, 2009

(30) Foreign Application Priority Data

Jun. 28, 2007 (JP) ................................ 2007-170648

(51) Int. Cl.
*H04N 15/00* (2006.01)
*H04N 7/18* (2006.01)
*A62B 1/04* (2006.01)
*A61B 1/04* (2006.01)
*H04N 9/47* (2006.01)

(52) U.S. Cl. ................ 348/45; 348/61; 348/65; 348/68; 348/72; 348/77

(58) Field of Classification Search ................ 348/45, 348/61, 65, 68, 72, 75, 77, 79
See application file for complete search history.

(56) References Cited

U.S. PATENT DOCUMENTS

| | | | |
|---|---|---|---|
| 6,184,922 B1* | 2/2001 | Saito et al. ........................ | 348/65 |
| 7,283,299 B2 | 10/2007 | Inomata | |
| 7,308,128 B2 | 12/2007 | Inomata | |
| 7,821,529 B2* | 10/2010 | Mochida et al. ................ | 348/65 |
| 2003/0040668 A1* | 2/2003 | Kaneko et al. ................ | 600/407 |
| 2006/0018031 A1* | 1/2006 | Takasugi ........................ | 359/661 |
| 2007/0015963 A1* | 1/2007 | Fengler et al. ................ | 600/109 |
| 2007/0088193 A1* | 4/2007 | Omori et al. .................... | 600/101 |
| 2007/0147033 A1* | 6/2007 | Ogawa et al. ................ | 362/230 |
| 2007/0197874 A1* | 8/2007 | Ishihara ........................ | 600/160 |
| 2007/0273877 A1* | 11/2007 | Kawano et al. ............... | 356/318 |
| 2008/0045800 A2* | 2/2008 | Farr .............................. | 600/179 |
| 2009/0058999 A1* | 3/2009 | Gono et al. ..................... | 348/71 |

FOREIGN PATENT DOCUMENTS

JP 2006-030969 2/2006

* cited by examiner

*Primary Examiner* — Karen Tang
(74) *Attorney, Agent, or Firm* — Kilyk & Bowersox, P.L.L.C.

(57) ABSTRACT

This invention provides an inexpensive image acquisition apparatus capable of capturing not only an image of a still object, but also an image of a moving object with the use of an appropriate quantity of illumination light. The image acquisition apparatus includes a head section incorporating an image acquisition device therein and including a lens module and an illuminating part, a main body section including an illumination light source, an image acquisition control part and an image processing part, and a cable section connecting between the main body section and the head section. The lens module is one of a first lens module incorporating therein a lens for high-speed observation and a second lens module incorporating therein a lens for enlargement observation, which is selectively attached to the head section. In a case where the first lens module is attached to the head section, the illuminating part is a first lens illumination unit for illuminating a region of which an image is captured by the first lens module. Herein, the first lens illumination unit is attached to the head section.

19 Claims, 29 Drawing Sheets

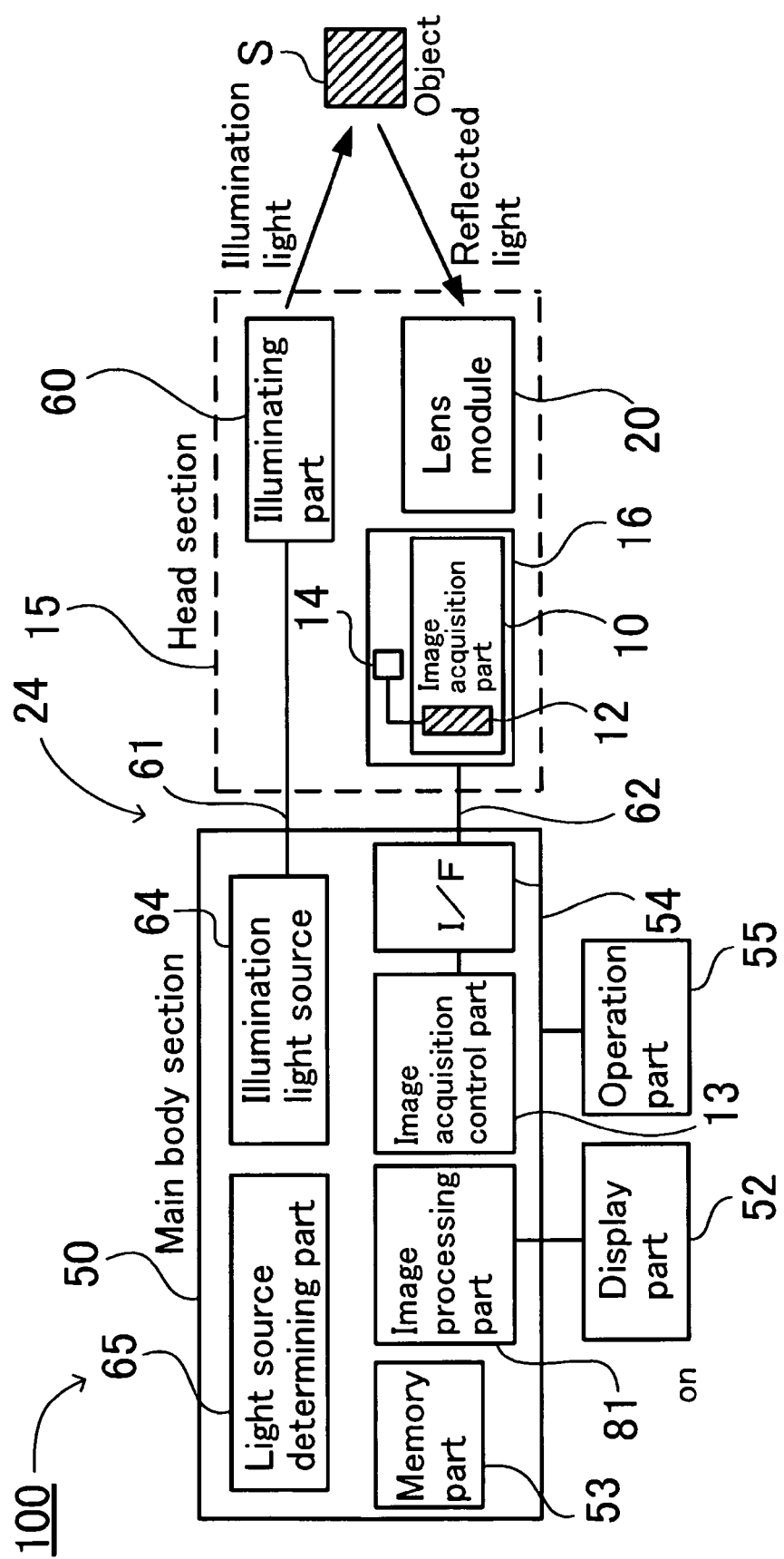

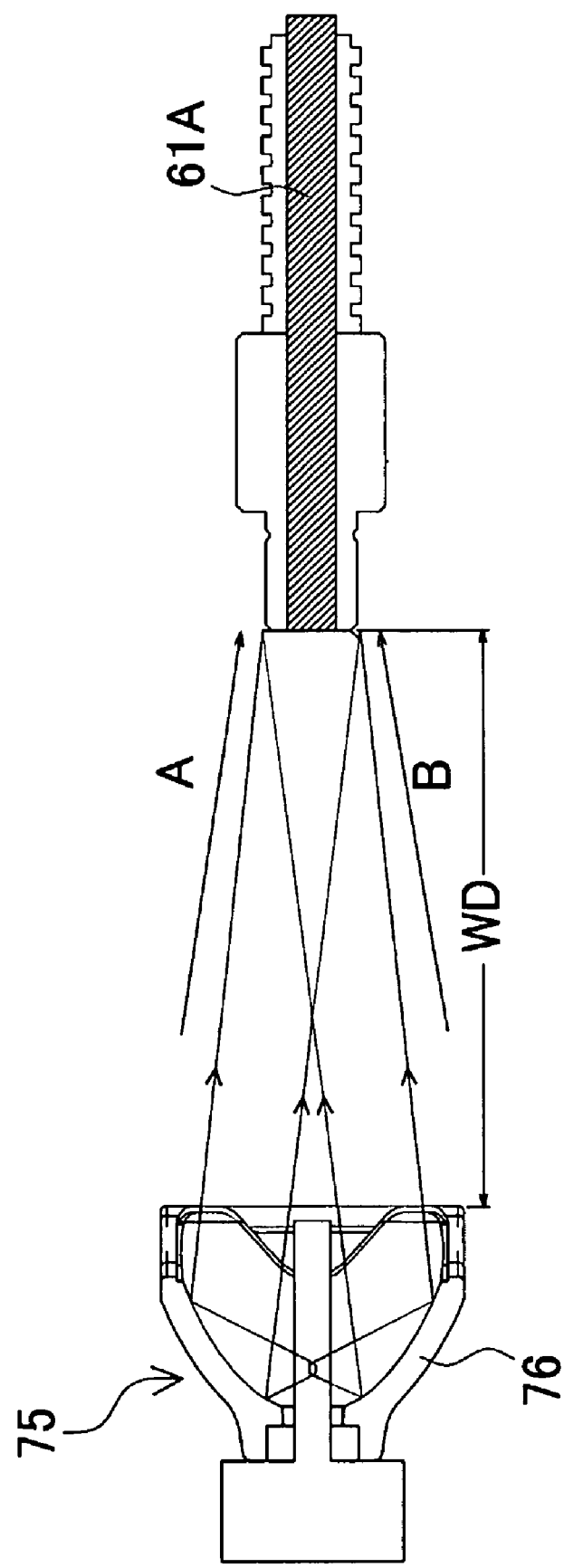

IMAGE ACQUISITION APPARATUS

The present application claims priority from Japanese Patent Application No. 2007-170648, filed Jun. 28, 2007, which is incorporated herein by reference.

BACKGROUND OF THE INVENTION (1) Field of the Invention

The present invention relates to an image acquisition apparatus, such as a digital magnifying observation apparatus or a microscope that captures and displays an enlarged image.

(2) Description of the Related Art

Examples of an image acquisition apparatus that displays an object (e.g., a sample such as a minute substance, a workpiece, or the like) in an enlarged manner include an optical microscope, a digital microscope and the like each adopting an optical lens. In the digital microscope, a light receiving device such as a CCD that electrically reads an image for each of pixels arranged in a two-dimensional form receives light reflected from or transmitting through an observation target held by an observation target holding part onto which an optical system emits light, and a display part such as a display displays the image read electrically (refer to, e.g., JP 2006-030969 A).

Typically, the image acquisition apparatus described above is designed for the purpose of capturing an image of a still object to observe the still object. In other words, the image acquisition apparatus is unsuitable for capturing an image of a moving object. In a case where the image acquisition apparatus is used for diagnosing a cause of a malfunction occurring at a manufacturing line in a factory, for example, there is a need to successively capture images of a moving object. In this case, conventionally, a special-purpose high-speed image acquisition camera such as a high-speed camera has been used for successively capturing images. However, such a high-speed image pickup camera is expensive in general and is not used ordinarily. Consequently, use of the high-speed image pickup camera is not efficient in terms of cost, management and maintenance.

If the conventional image acquisition apparatus is used for capturing an image at a high speed, further, there arises a problem of an insufficient quantity of light. More specifically, if the image acquisition apparatus is used for the purpose of use for high-speed image capture, a working distance from the camera to the object becomes considerably long in comparison with a case where the image acquisition apparatus is used for the purpose of use for normal enlargement observation. Consequently, a quantity of light to be emitted to the object decreases inversely with a square of a distance. In addition, if the image capturing speed becomes higher, the quantity of the light relatively decreases. In the image acquisition apparatus, for example, the image capturing speed per one image is about 1/30th second as in the case of a normal video camera. On the other hand, the high-speed image pickup camera captures an image in an extremely short time in a range from 1/1000th second to 1/10000th or 1/1000000th second. For this reason, the high-speed image pickup camera requires a relatively high level of illuminance per unit frame. Conventionally, a separate illuminating fixture must be prepared independently of the camera. Herein, examples of the illuminating fixture include a light source capable of continuously emitting strong light, such as a halogen lamp or a metal halide lamp, a flash lamp capable of achieving high illuminance only in a short time, a light source emitting a pulse laser in synchronization with an image capturing period, and the like. However, such an illuminating fixture is expensive in general.

In addition, operations such as installation of the illuminating fixture or positional adjustment of a target to be irradiated with light become burdensome to a user. Depending on types of light sources, further, a certain light source is still unsatisfactory in illuminance. Alternatively, another light source is satisfactory in illuminance, but is unsatisfactory in color rendering. Consequently, these light sources must selectively be used in accordance with the purpose of use. However, such a light source is of a fixed type in general; therefore, an operation for exchanging the light source becomes burdensome to a user. Hence, a plurality of illuminating fixtures different in types from one another must be prepared, resulting in further increase of cost and effort.

In addition, when a large quantity of illumination light is attempted to be obtained for an object having a long working distance, a center portion of the illumination light becomes dark, so that the quantity of illumination light decreases. Consequently, there arises a problem of so-called hollow defective illumination. As shown in FIG. 23, more specifically, a light collecting lamp directly collects light for an optical fiber 61A. In this configuration, since a light emitting tube itself of a light source serves as a shade, the light emitted from the lamp is reflected by a reflector and, then, is made incident onto the optical fiber 61A in directions shown by arrow marks A and B. When the light is emitted toward a farther side through the optical fiber 61A, a center of emission becomes dark at the farther side, that is, hollow defective illumination occurs at the farther side due to lack of an optical component parallel with an optical axis. Consequently, the problem of hollow defective illumination becomes obvious with regard to the object having the large working distance. Hence, the object can not be irradiated with a satisfactory quantity of illumination light with ease.

SUMMARY OF THE INVENTION

The present invention has been devised in view of the conventional problems described above. A principal subject of the present invention is to provide an inexpensive image acquisition apparatus capable of capturing not only an image of a still object, but also an image of a moving object with the use of an appropriate quantity of illumination light.

In order to achieve this subject, the present invention provides an image acquisition apparatus for capturing an image of an observation target. The image acquisition apparatus includes a head section, a main body section and a cable section. The head section includes an image pickup module that incorporates therein an image acquisition part for capturing an image, a lens module that is connected to the image pickup module and incorporates therein an optical lens optically coupled to the image acquisition part, and an illuminating part that illuminates an observation target of an image formed on the image acquisition part through the lens module. The main body section includes an illumination light source that supplies illumination light to the illuminating part, an image acquisition control part that generates an image acquisition control signal for controlling the image acquisition part and, then, transmits the image acquisition control signal to the image acquisition part, and an image processing part that performs an imaging process on an enlarged image captured by the image acquisition part. The cable section includes an illumination light supply cable that connects between the illumination light source in the main body section and the illuminating part in the head section and supplies the illumination light from the illumination light source to an observation target region through the lens module, and a signal transmission cable that transmits the image acquisition control signal from the image acquisition control part in the main body section to the image acquisition part in the head section and, also, transmits an image signal from the image acquisition part to the image processing part in the main body section. The cable section connects between the main body section and the head section. Herein, the lens module is one of a first lens module incorporating therein an optical lens for high-speed observation and a second lens module incorporating therein an optical lens for enlargement observation, which is selectively attached to the head section. In a case where the first lens module is attached to the head section, the illuminating part is a first lens illumination unit that adjusts a working distance of illumination light for illuminating a region of which an image is captured by the first lens module, and the first lens illumination unit is attached to the head section. According to the present invention, the high-speed image capturing function is added to the image acquisition apparatus, leading to improvement of convenience. In particular, appropriate one of the lens modules can be selectively attached to the image acquisition apparatus in accordance with the purpose of use for observation. Therefore, the single image acquisition apparatus can be used for the purpose of use for enlargement observation and for the purpose of use for high-speed observation. In the case where the image acquisition apparatus is used for the purpose of use for high-speed observation which requires a higher level of illuminance in comparison with the case where the image acquisition apparatus is used for the purpose of use for enlargement observation, the preparation of the separate first lens illumination unit allows projection of a satisfactory quantity of illumination light to a region of which an image is captured.

BRIEF DESCRIPTION OF THE DRAWINGS

FIG. 1 is a block diagram showing an image acquisition apparatus according to one embodiment of the present invention;

FIG. 23 is a sectional view showing a configuration that a light collecting lamp directly collects light for an optical fiber.

DESCRIPTION OF THE PREFERRED EMBODIMENTS

Figure 2A:
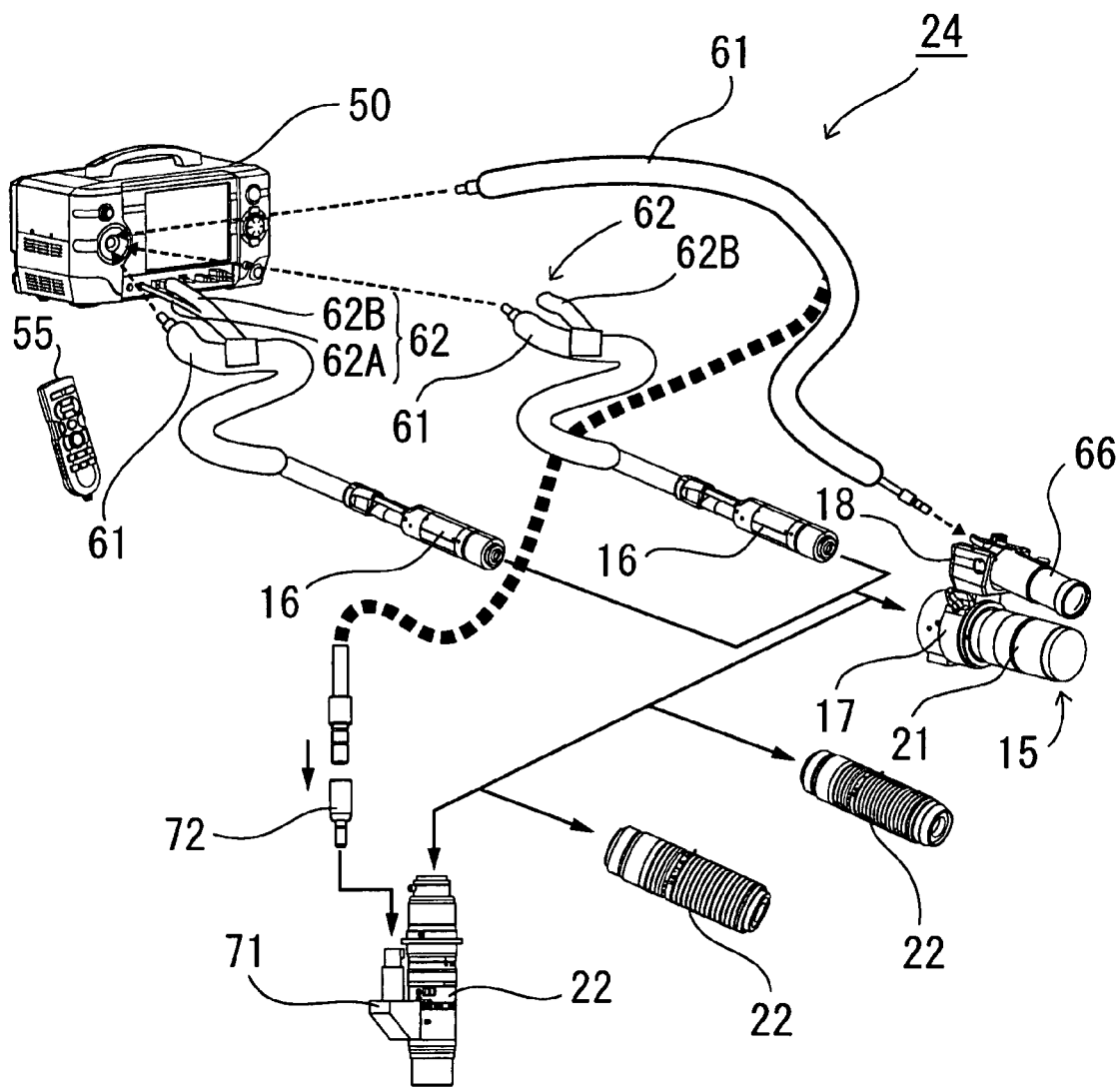
FIG. 2A shows a configuration that an image acquisition system adopts a cable section in which an illumination light supply cable and a signal transmission cable are partly integrated into one.

Hereinafter, description will be given of one preferred embodiment of the present invention with reference to the drawings. However, the embodiment to be described later merely exemplifies an image acquisition apparatus for embodying a technical idea of the present invention. Therefore, the image acquisition apparatus of the present invention is not particularly limited to the following embodiment. In this specification, members described in the scope of claims for patent are not limited to those described in the following embodiment. In particular, the sizes, materials, shapes, relative arrangement and the like of the constituent components described in the following embodiment are not intended for imposing limitation on the scope of the present invention unless otherwise specified. In the respective drawings, the sizes, positional relation and the like of the members are slightly exaggerated for explicit description. In the following description, further, an identical or equal member is denoted by a single designation or numeric symbol; therefore, detailed description thereof will not be given appropriately. With regard to the respective components forming the present invention, a plurality of components may be formed from one member or one member may serve as a plurality of components. Alternatively, functions of one member may be realized by a plurality of members.

Data communications between the image acquisition apparatus according to this embodiment of the present invention and peripheral appliances such as a computer, a printer and an external storage device for processes such as operation, control and display are established electrically, magnetically or optically through serial connection or parallel connection (e.g., IEEE1394, RS-232x, RS-422, USB) or through network connection (e.g., 10BASE-T, 100BASE-TX, 1000BASE-T). The connection is not limited to physical connection using a cable, but may be wireless connection using a wireless LAN such as IEEE802.1x or wireless connection using electric waves, infrared rays or optical communications such as Bluetooth. Further, examples of a recording medium for exchanging data or saving settings include a memory card, a magnetic disc, an optical disc, a magneto-optical disc, a semiconductor memory and the like. In this specification, the image acquisition apparatus covers not only the image acquisition apparatus itself, but also an enlargement observation system in which the image acquisition apparatus is combined with peripheral appliances such as a computer and an external storage device.

In this specification, the image acquisition apparatus is not limited to a system itself for capturing an image for enlargement observation or an image for high-speed observation as well as an apparatus or a method for performing processes such as input, output, display, calculation and communication relative to the image capturing operation in a hardware manner. Of course, an apparatus or a method for performing the foregoing processes in a software manner are included in the scope of the present invention. For example, an apparatus or a system that achieves an image capturing process and processes related thereto in such a manner that a general-purpose circuit or a general-purpose computer incorporates therein software, a program, a plug-in, an object, a library, an applet, a compiler, a module, or a macro running on a specific program also corresponds to the image acquisition apparatus according to the present invention. In this specification, moreover, the computer covers a general-purpose or special-purpose electronic computer, a work station, a terminal, a portable electronic device, a portable telephone of PDC, CDMA, W-CDMA, FOMA (registered trademark), GSM, IMT2000 or 4G, and electronic devices such as a PHS, a PDA, a pager and a smart phone. In this specification, further, the program is not limited to that used singly, and may be used in a form functioning as a part of a specific computer program, software or a service, a form functioning while being called if necessary, a form provided as a service in an environment such as an OS, a form operated while being resident in the environment, a form operated on the background, and a form as another support program.

In this specification, the high-speed observation is also referred to as high-speed image capture. Herein, a momentary image, which can not be recognized by human eyes, is captured as a plurality of successive frame images. Such an image capturing operation is performed at a frame rate (a unit for defining the number of images to be successively captured in one second) in a range from 100 to 1000000 fps. Herein, the image of the object may be captured in an enlarged manner if necessary. The enlargement observation stands for an operation for displaying, in an enlarged manner, a still object, that is, an object which is not changed physically. For example, the object is enlarged in a range from 10 to 100000 times.

(Block Diagram)

FIG. 1 is a block diagram showing an image acquisition apparatus 100 according to one embodiment of the present invention. As shown in this figure, the image acquisition apparatus 100 includes: a head section 15 that includes an image pickup module 16 incorporating an image acquisition part 10 therein, an illuminating part 60, and a lens module 20; a main body section 50 that drives and controls the head section 15, and performs various processes such as an imaging process; and a cable section 24 that connects between the head section 15 and the main body section 50. The main body section 50 includes: an illumination light source 64 that supplies illumination light to the illuminating part 60; an image acquisition control part 13 that generates an image acquisition control signal for controlling the image acquisition part 10 and, then, transmits the image acquisition control signal to the image acquisition part 10; and an image processing part 81 that performs an imaging process on an enlarged image captured by the image acquisition part 10. The main body section 50 also includes: a display part 52 that displays an image captured by the image acquisition part 10; and an operation part 55 that allows a user to conduct various settings and operations. The image acquisition apparatus 100 can be used for various purposes of use in such a manner that the lens module 20 and the illuminating part 60 are exchanged in accordance with the purpose of use for observation.

Figure 2B:
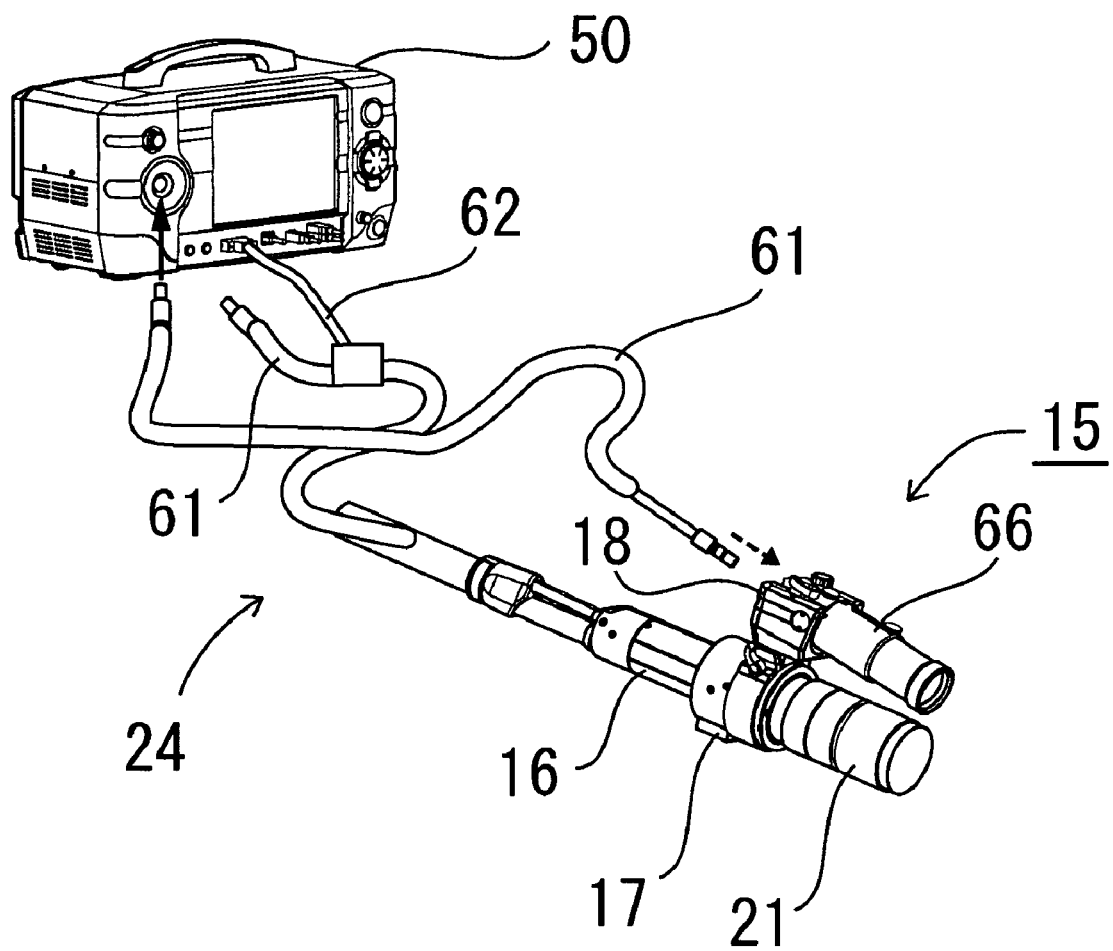
FIG. 2B shows a configuration that the image acquisition system adopts a head section for high-speed image capture.
Figure 2C:
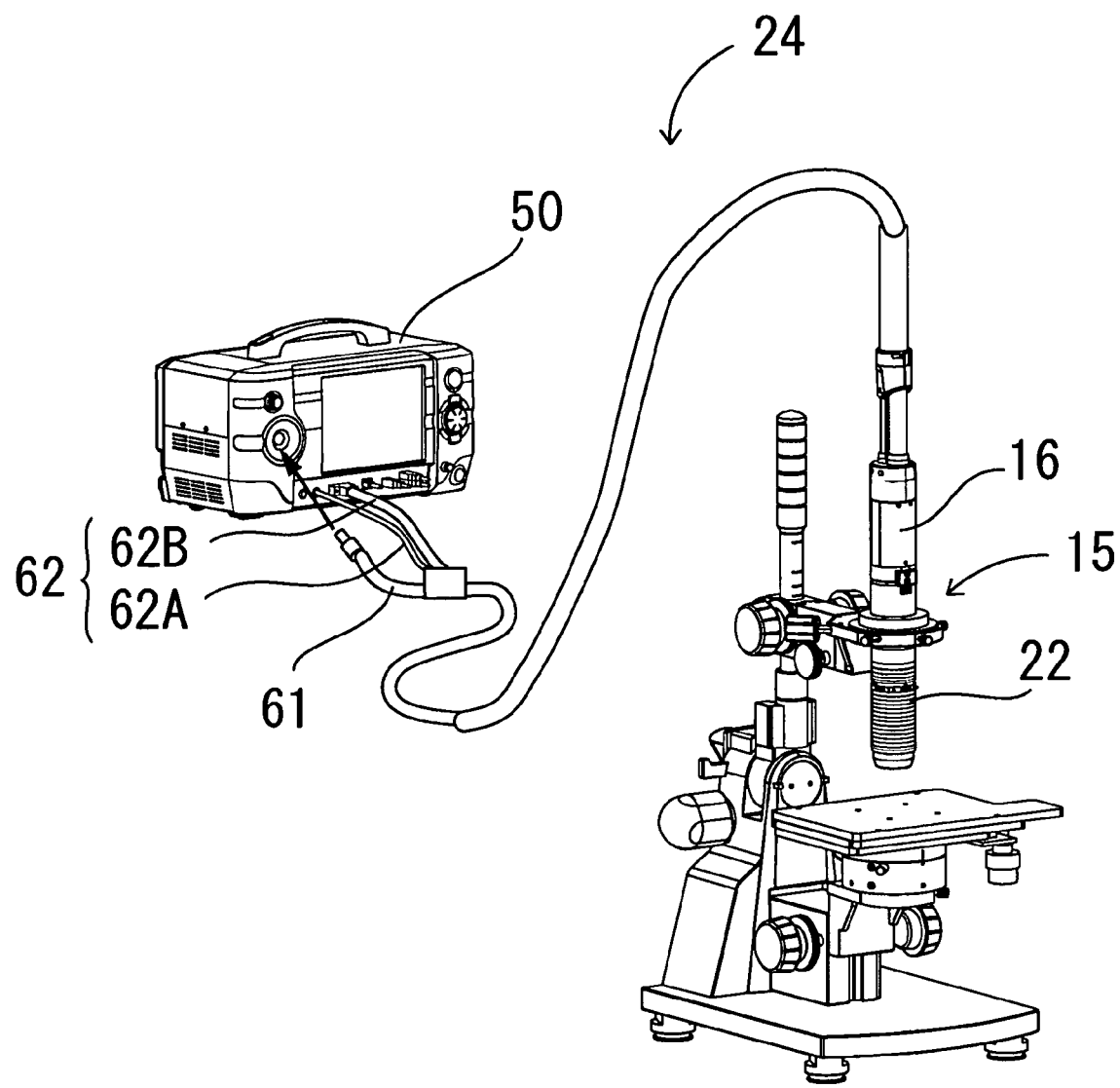
FIG. 2C shows a configuration that the image acquisition system adopts a head section for enlargement observation which is provided with a ring-shaped illumination source.
Figure 2D:
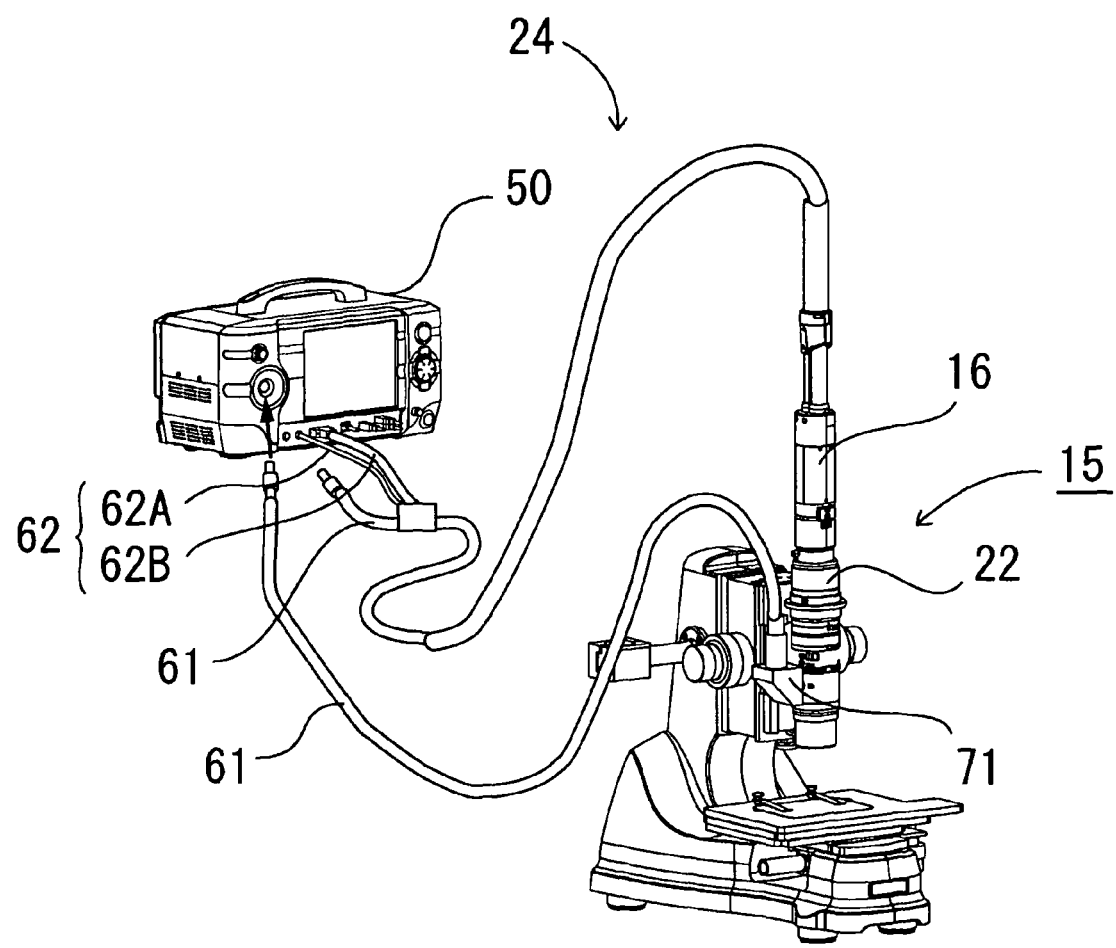
FIG. 2D shows a configuration that the image acquisition system adopts the head section for enlargement observation which is provided with a coaxial epi-illumination source.
Figure 3A:
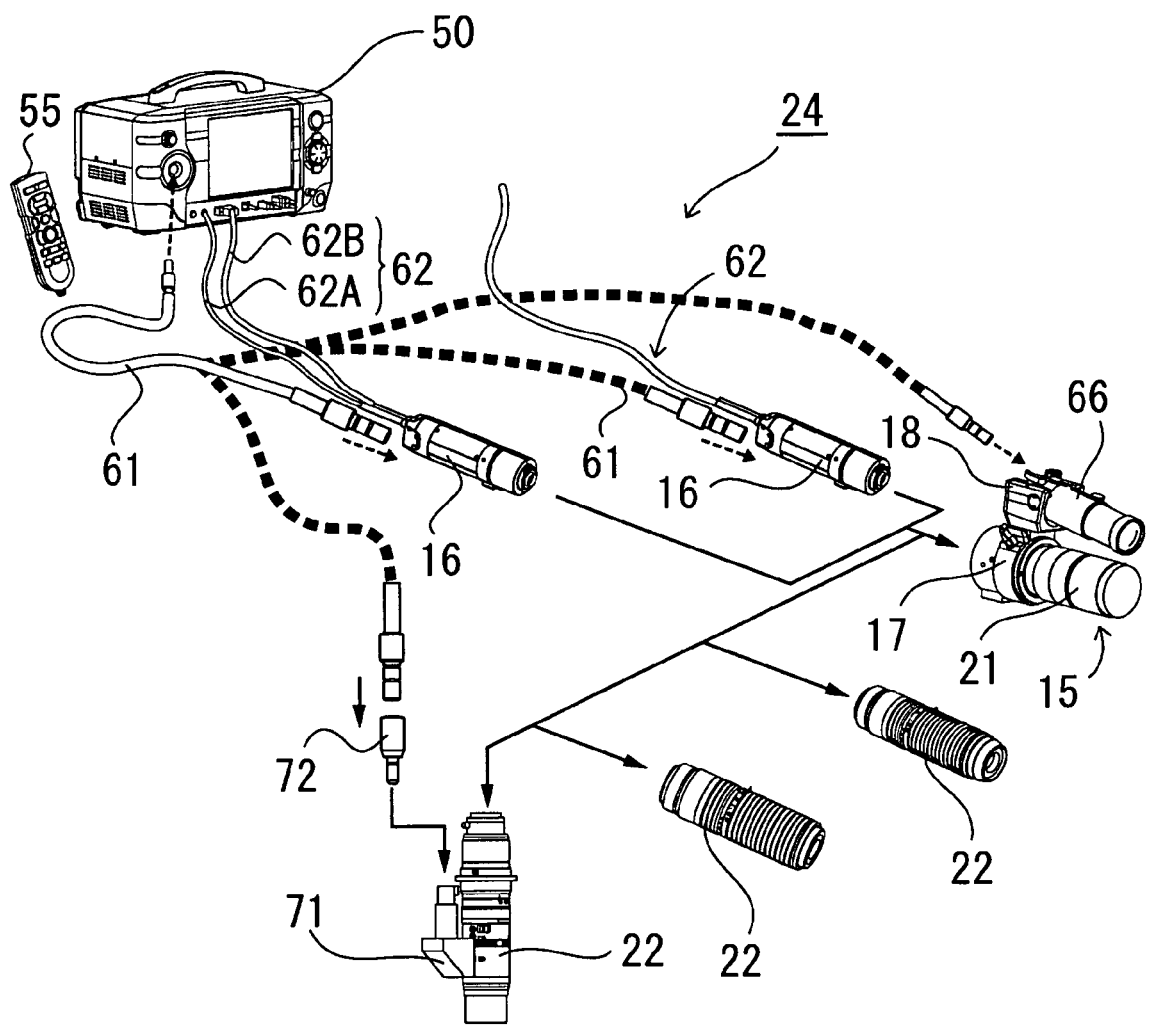
FIG. 3A shows a configuration that the image acquisition system adopts the head section for high-speed image capture.
Figure 3B:
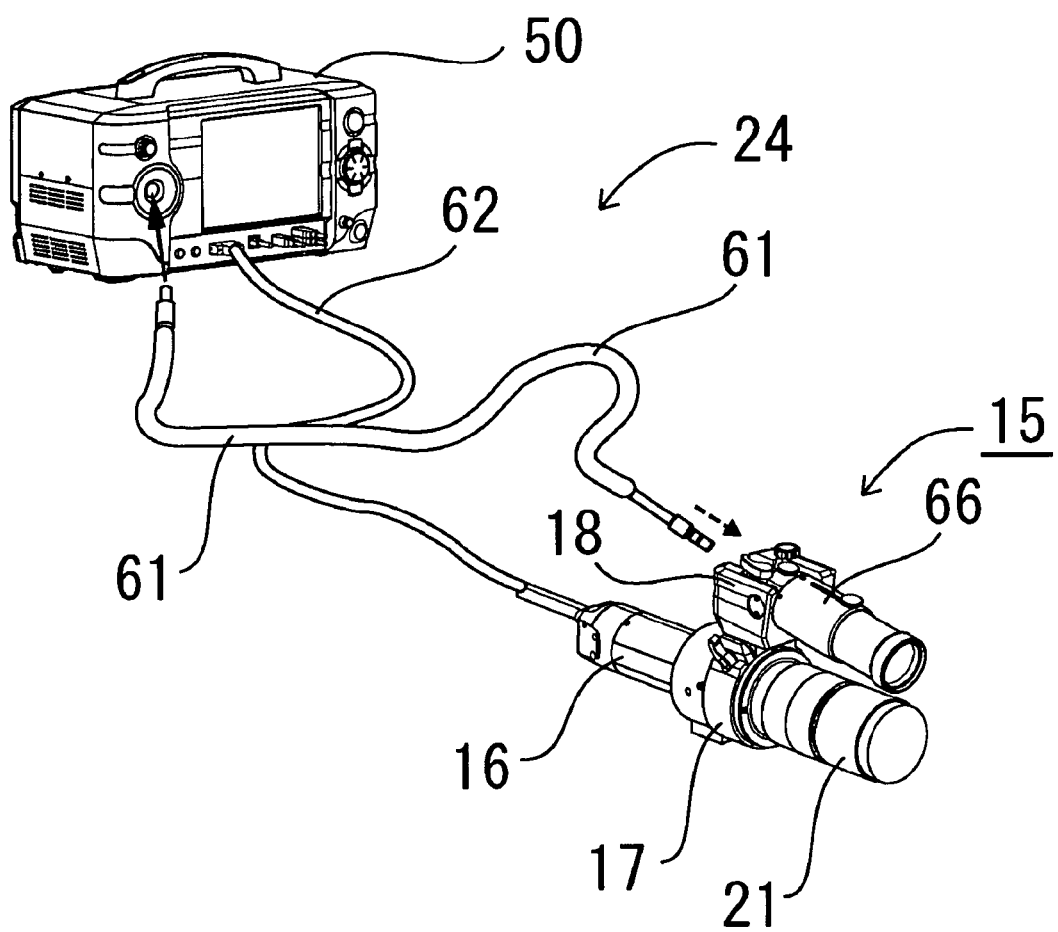
FIG. 3B shows a configuration that the image acquisition system adopts the cable section in which the illumination light supply cable and the signal transmission cable are provided separately.
Figure 3C:
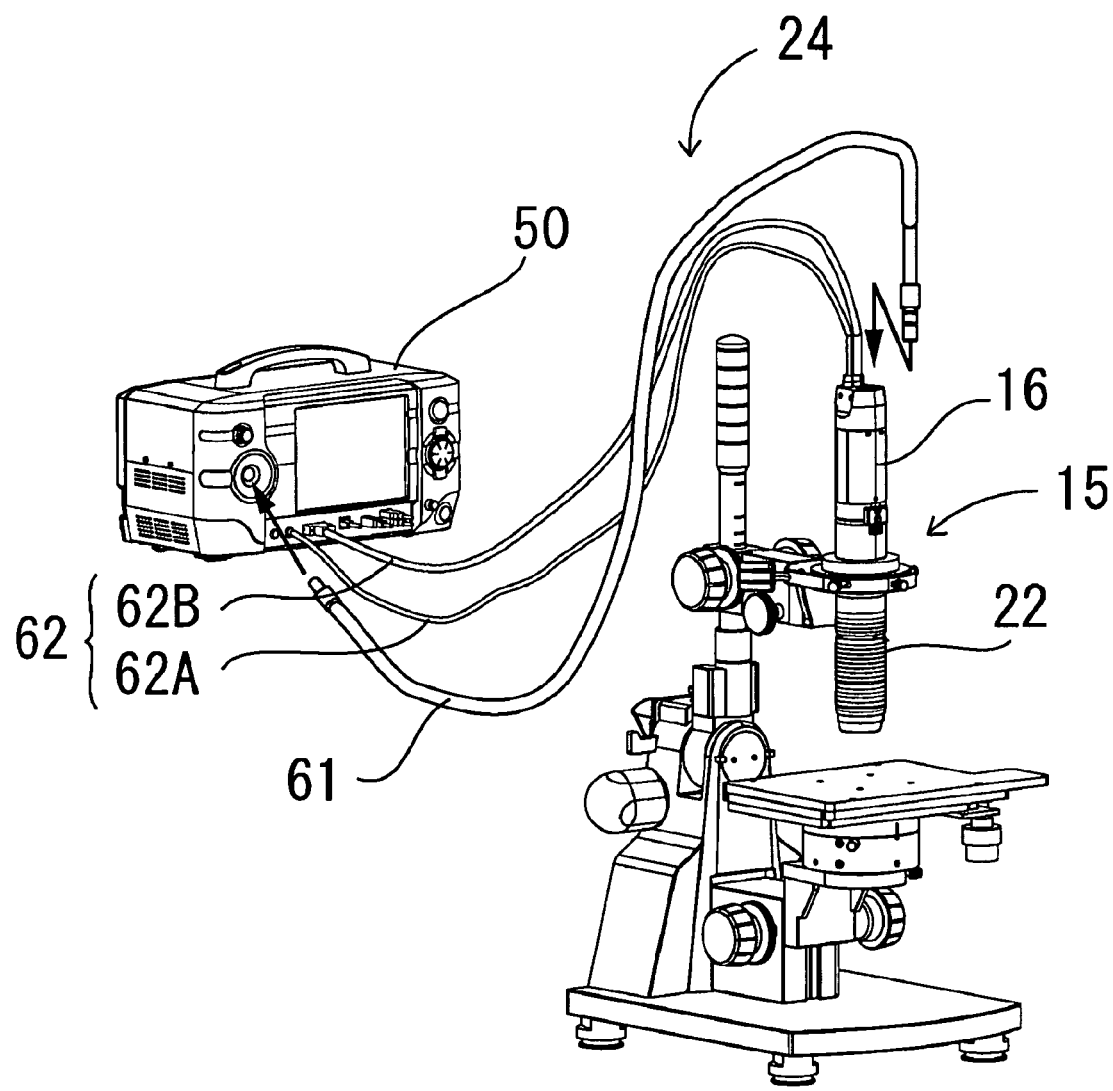
FIG. 3C shows a configuration that the image acquisition system adopts the head section for enlargement observation which is provided with the ring-shaped illumination source.
Figure 3D:
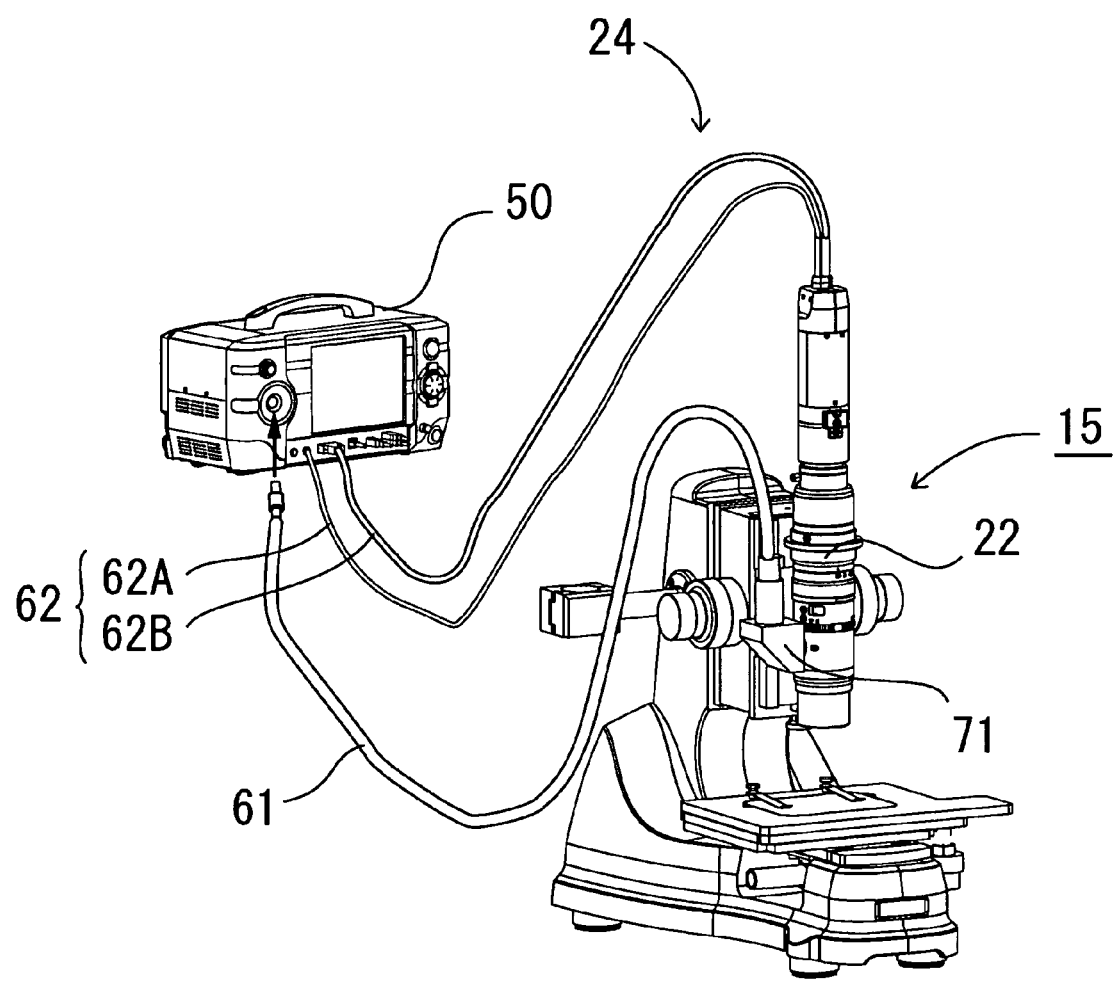
FIG. 3D shows a configuration that the image acquisition system adopts the head section for enlargement observation which is provided with the coaxial epi-illumination source.

FIGS. 2A, 2B, 2C, 2D, 3A, 3R, 3C and 3D show an example of a configuration that the head section 15 to be changed in accordance with the purpose of use is connected to the main body section 50. In FIGS. 2A to 2D, the cable section 24 has a configuration that an illumination light supply cable 61 and a signal transmission cable 62 are partly integrated into one. In FIGS. 3A to 3D, the cable section 24 has a configuration that the illumination light supply cable 61 and the signal transmission cable 62 are provided separately. More specifically, FIGS. 2A and 3A show a configuration that the head section 15 is exchangeable, in an exploded manner. FIGS. 2B and 3B show a configuration that the head section 15 for high-speed observation is connected to the main body section 50 through the cable section 24. FIGS. 2C and 3C show a configuration that the head section 15 for enlargement observation provided with a ring-shaped illumination source is connected to the main body section 50 through the cable section 24. FIGS. 2D and 3D show a configuration that the head section 15 for enlargement observation provided with a coaxial epi-illumination source is connected to the main body section 50 through the cable section 24. As shown in these figures, the members that form the head section 15 are changed in an attachment manner so as to provide the variety of head sections. Thus, the single image acquisition apparatus can be used for the various purposes of use. Herein, the head section 15 for high-speed observation and the head section 15 for enlargement observation are prepared largely. The illuminating part 60 for the head section 15 for enlargement observation may be the ring-shaped illumination source or the coaxial epi-illumination source. As described above, the head section 15 can be selectively used in accordance with the purpose of use.

(Head Section 15)

In the head section 15, the image acquisition module 16 incorporates the image acquisition part 10 therein. The image acquisition part 10 includes an image acquisition device 12 that receives, through an optical system, and electrically reads light which is emitted from the illuminating part 60 and, then, is reflected from an object S (e.g., a sample, a workpiece or the like) serving as is an observation target. In this embodiment, the image acquisition device 12 is a CMOS image sensor, but may be another device such as a CCD. As shown in FIG. 2A, herein, the head section 15 has an outer peripheral shape configured by the cylindrical-shaped image acquisition module 16, and the image acquisition module 16 incorporates the image acquisition device 12 therein. The image acquisition device 12 incorporated in the image acquisition module 16 may be intended for capturing a monochrome image or for capturing a color image. For example, an image acquisition device such as a cooling CCD can capture a monochrome image with high definition. Therefore, a plurality of image pickup modules, that is, the image acquisition module 16 intended for capturing a monochrome image and the image acquisition module 16 intended for capturing a color image are prepared and selectively used in accordance with the purpose of use for observation. Thus, the image acquisition apparatus can respond to various purposes of use.

(Pixel Shifting Part 14)

The image acquisition part 10 may further include a pixel shifting part 14 in order to attain a high resolution which is more than a resolution of a CMOS image sensor by pixel shifting. Examples of the pixel shifting are disclosed in JP 58-111580 A (single-plate type) and JP 01-123580 A (three-plate type). For example, an element (a pixel) is physically shifted to a space formed between adjoining elements (pixels) by means of a piezoelectric element or the like in order to combine an image captured in such a manner that the object S is shifted by a half of a pixel pitch with an image captured without shifting; thus, a high resolution is achieved. Further, when RGB data is acquired for each pixel, color reproducibility is also improved. Typical examples of a method of the pixel shifting may include a CCD driving method for moving the image acquisition device 12 by means of an actuator or the like, an LPF tilting method for tilting an LPF, a lens moving method for moving a lens, and the like. A pixel shifting signal for the pixel shifting is transmitted from the main body section 50 to the head section 15 through a pixel shifting signal cable 62A. In order to perform enlargement observation, typically, an image acquisition device to be used for this purpose of use tends to have a high resolution. If such an image acquisition device having a high resolution is used for capturing an image at a high speed, a reading speed from the image acquisition device tends to be low. In order to overcome this disadvantage, an image acquisition device to be used in the image acquisition apparatus according to this embodiment can respond to both "enlargement observation" and "high-speed image capture". For example, there is used an image acquisition device having about 300000 pixels and having a reading speed which is satisfactory in the high-speed image capture. In a case where the image acquisition device is used for capturing a still image, that is, an image for enlargement observation, the foregoing pixel shifting part is used for enhancing a resolution, so that the image acquisition device can respond to the two different observations. It is needless to say herein that in the high-speed image capture mode, a controller in the main body section automatically or manually recognizes the high-speed image capture mode so as to deactivate the pixel shifting part.

In the head section 15, the lens module 20 and the illuminating part 60 are also exchangeable in accordance with the purpose of use. The lens module 20 may be a first lens module 21 that incorporates therein a lens for high-speed observation and a second lens module 22 that incorporates therein a lens for enlargement observation. The illuminating part 60 to be provided is changed in accordance with the selected lens module 20. In this embodiment, the illuminating part 60 for the second lens module 22 is an illumination optical path 67 which is incorporated in the second lens module 22. On the other hand, the illuminating part 60 for the first lens module 21 is a separate first lens illumination unit 66 for illuminating a region of which an image is captured by the first lens module 21, and the first lens illumination unit 66 is attached to the head section 15.

In the head section 15, as described above, the image acquisition part 10 is incorporated in the image acquisition module 16, and the lens module 20 is of an attachment type. Moreover, the illuminating part 60 may be incorporated in the lens module 20 or may be attached to the head section 15 or the lens module 20, independently of the lens module 20. Of course, the present invention is not limited to the configuration described above. For example, the illuminating part 60 for enlargement observation and the illuminating part 60 for high-speed observation may be provided separately. Alternatively, the illuminating part for high-speed observation may be incorporated in the first lens module. In addition, the image acquisition part 10 may be exchanged as follows. For example, the image acquisition part 10 may be exchanged in such a manner that the image acquisition module 16 is exchanged. Moreover, the image acquisition part 10 may be incorporated in the lens module or may be attached to the lens module or the illustrating part. Alternatively, a plurality of image acquisition devices may be incorporated in the image pickup module such that one of them is used in a switchable manner.

(Lens Module 20)

Figure 4:
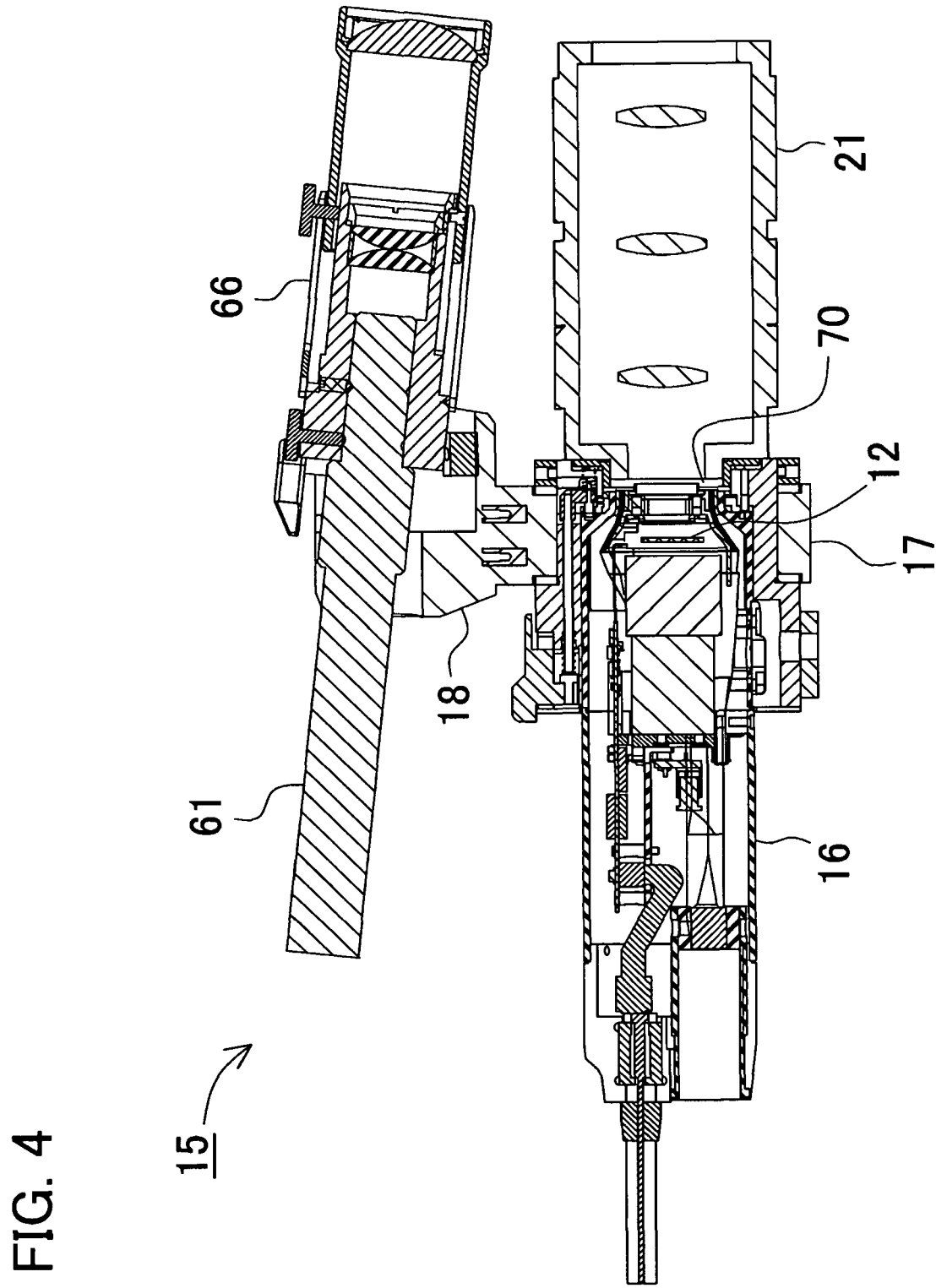
FIG. 4 is a sectional view showing a configuration that the head section includes a first lens module.
Figure 5:
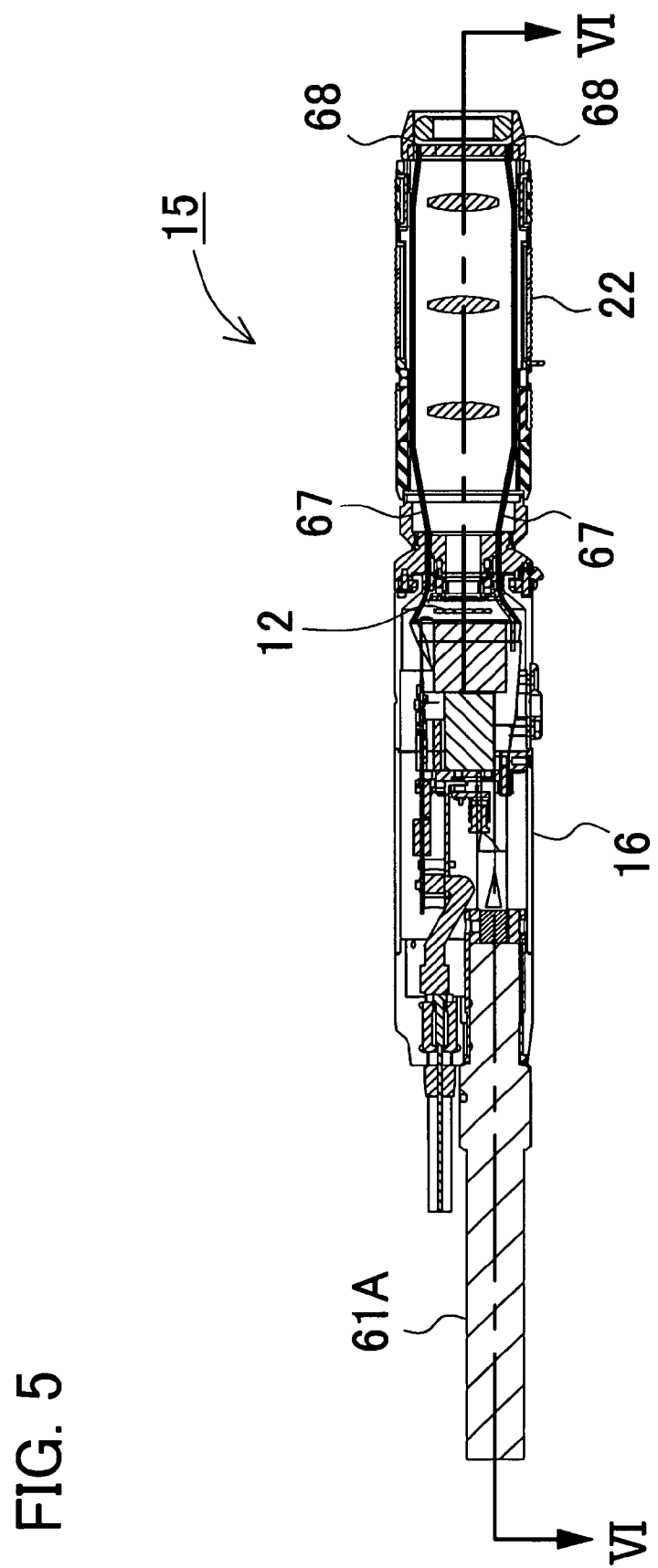
FIG. 5 is a vertical sectional view showing a configuration that the head section includes a second lens module.
Figure 6:
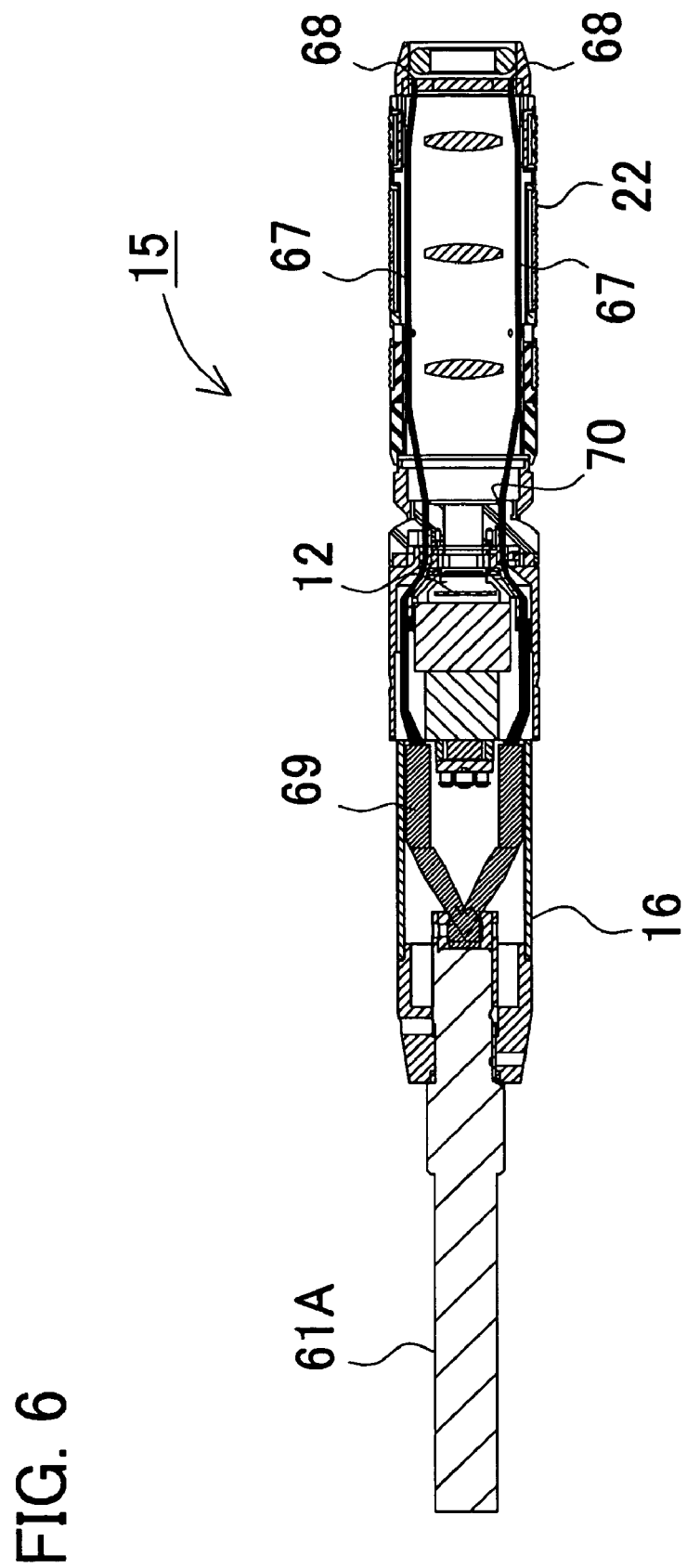
FIG. 6 is a horizontal sectional view taken along line VI-VI in FIG. 5.

The lens module 20 incorporates therein an optical lens optically coupled to the image acquisition device 12. Herein, the lens module 20 is the first lens module 21 incorporating therein the lens for high-speed observation or the second lens module 22 incorporating therein the lens for enlargement observation. FIG. 4 is a sectional view showing a case where the head section 15 includes the first lens module 21. FIG. 5 is a vertical sectional view showing a case where the head section 15 includes the second lens module 22. FIG. 6 is a horizontal sectional view taken along line VI-VI in FIG. 5. As shown in these figures, the lens module 20 has a plurality of optical lenses which are different in size and curvature from each other, and one of the plurality of lenses is selectively used in accordance with required magnification and brightness.

(Illuminating Part 60)

The illuminating part 60 illuminates the object S of which an image is formed on the image acquisition device 12 through the lens module 20. A light source for the illuminating part 60 is incorporated in the main body section 50, and illumination light from the light source is transmitted to the illuminating part 60 in the head section 15 through the cable section 24. The illuminating part 60 may be incorporated in the head section 15. Alternatively, the illuminating part 60 may be attachable to/detachable from the head section 15. Herein, the first lens illumination unit 66 corresponding to the illuminating part 60 for the first lens module 21 is attached to the head section 15 in a removable manner. On the other hand, the illumination optical path 67, more specifically, the ring-shaped illumination source corresponding to the illuminating part 60 for the second lens module 22 is incorporated in the second lens module 22.

(First Lens Illumination Unit 66)

Figure 10:
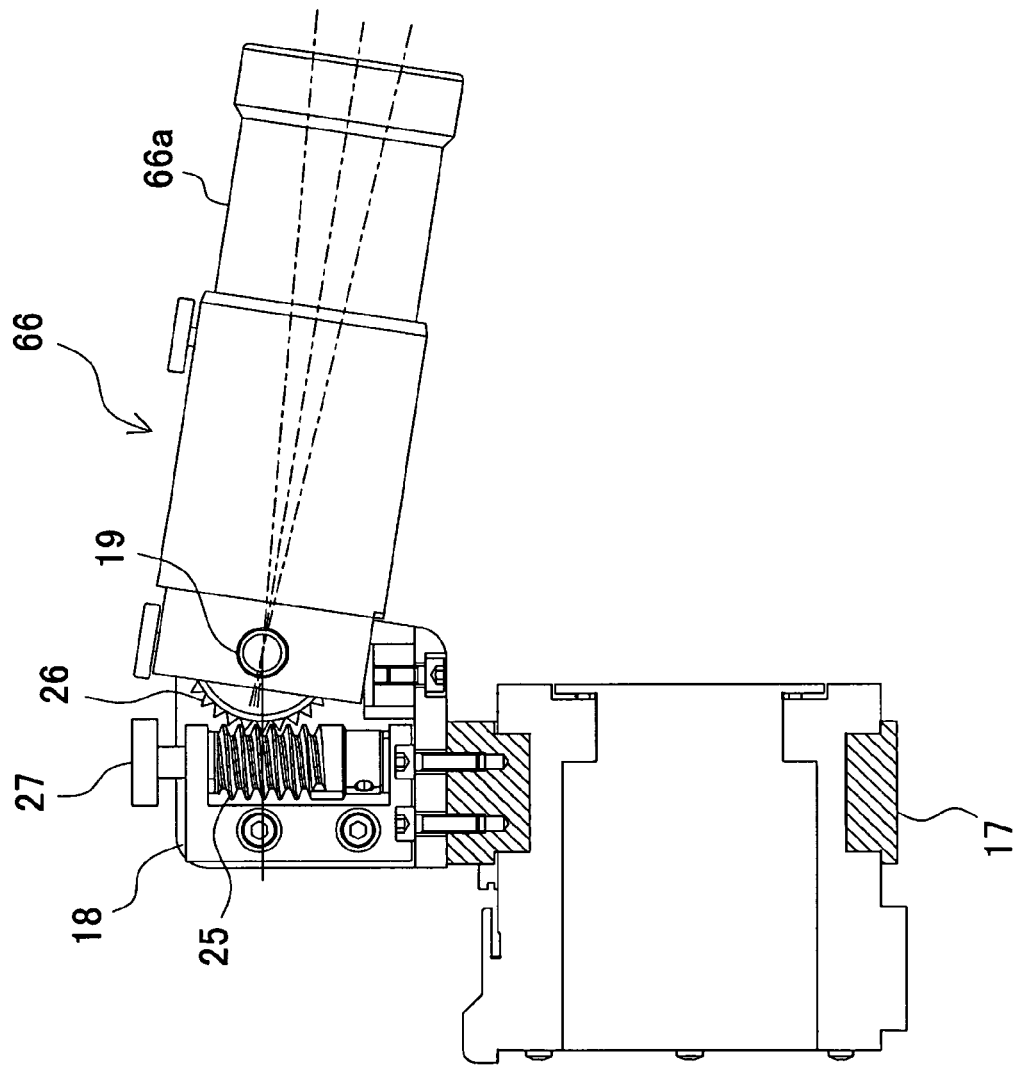
FIG. 10 is a vertical sectional view showing an illumination unit tilt angle adjusting part, which corresponds to a part of FIG. 9.

The first lens illumination unit 66 has a rear end connected with the illumination light supply cable 61. As shown in FIG. 4 and FIG. 10 (to be described later), moreover the first lens illumination unit 66 has a shaft hole formed at a portion in the vicinity of the rear end thereof, and is secured, at the shaft hole, to a tilting shaft 19 of an illumination unit mount 18.

This configuration allows the first lens illumination unit 66 to pivot on the shaft hole formed at the rear end.

(Portion where First Lens Illumination Unit 66 is Attached)

Figure 7A:
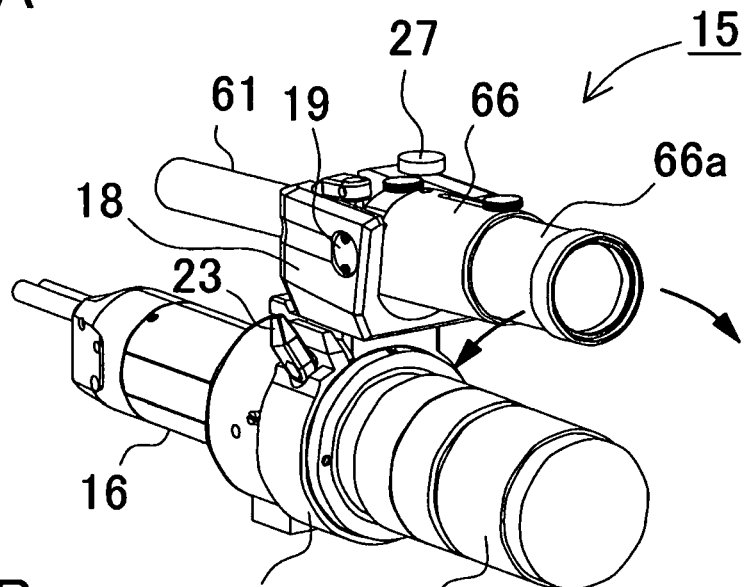
FIGS. 7A, 7B and 7C are perspective views each showing a configuration that a first lens illumination unit is secured to the first lens module so as to freely rotate through a rotary ring in the head section.
Figure 7B:
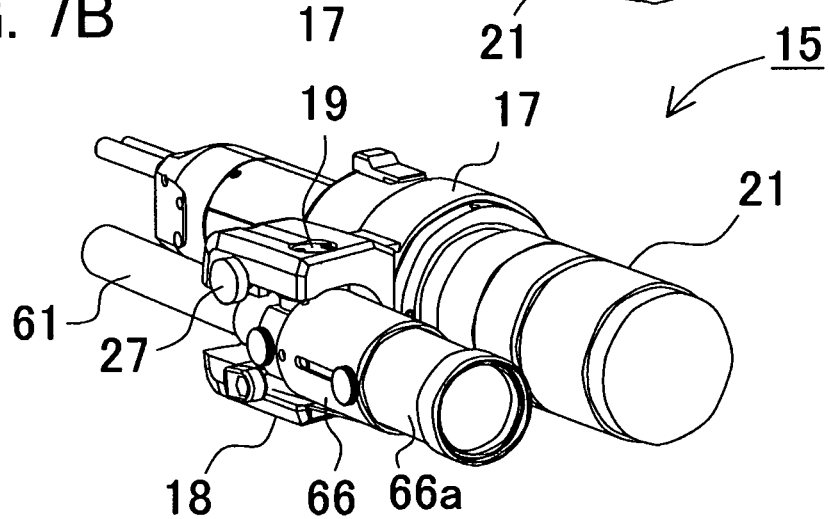
Figure 7C:
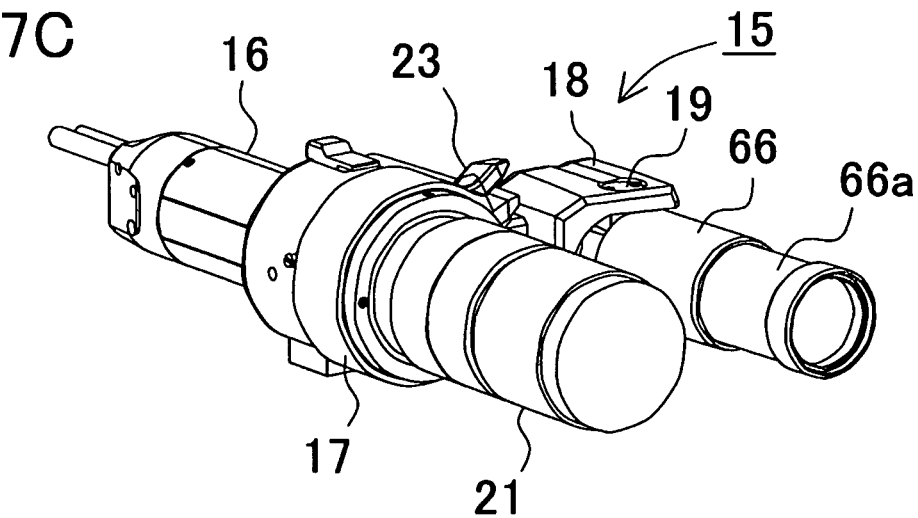

FIGS. 7A, 7B and 7C are perspective views each showing a configuration that the first lens illumination unit 66 is secured to the first lens module 21 in the head section 15. As shown in these figures, the first lens illumination unit 66 is secured to a top side of the first lens module 21. Specifically, the illumination unit mount 18 which has an opened upper side, that is, which is formed into a "U" shape when being seen in a sectional view is secured onto a rotary ring 17 which is secured to the cylindrical outer periphery of the first lens module 21 in a rotatable manner. Then, the first lens illumination unit 66 is secured to the illumination unit mount 18 so as to be freely tilted about the tilting shaft 19. The configuration that the rotary ring 17 is rotatable brings about the following advantage. As shown in FIGS. 7A to 7C, the first lens illumination unit 66 can rotate about an optical axis of the cylindrical first lens module 21, that is, the image acquisition device 12 while being secured to the first lens module 21. In addition, a lock lever 23 is provided for holding the rotary ring 17 at an optional rotating position with respect to the first lens module 21. The provision of the lock lever 23 allows adjustment of an illumination light emitting direction. For example, in a case where the illumination light is partly shaded depending on an arrangement position of the head section 15, the position of the first lens illumination unit 66 is changed to prevent such a disadvantageous case.

(Illumination Unit Tilt Angle Adjusting Part)

Figure 8A:
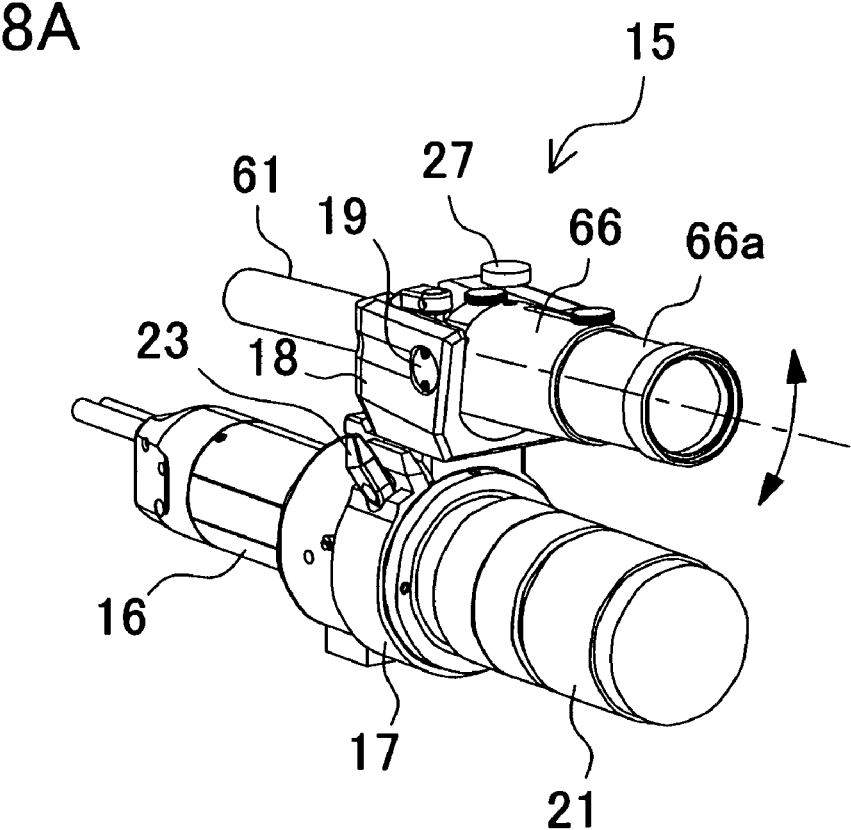
FIGS. 8A and 8B are perspective views each showing a state that the first lens illumination unit is tilted.
Figure 8B:
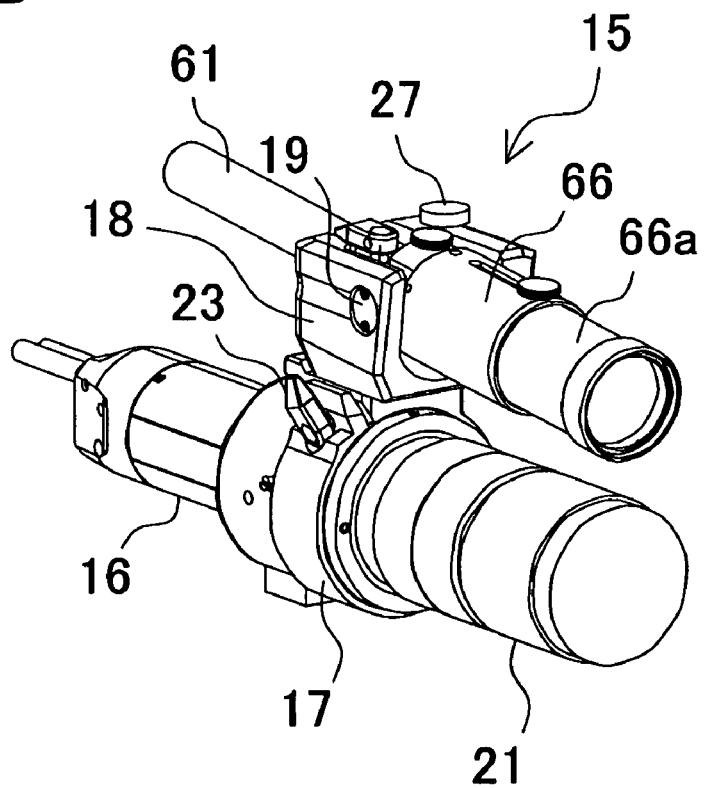
Figure 9:
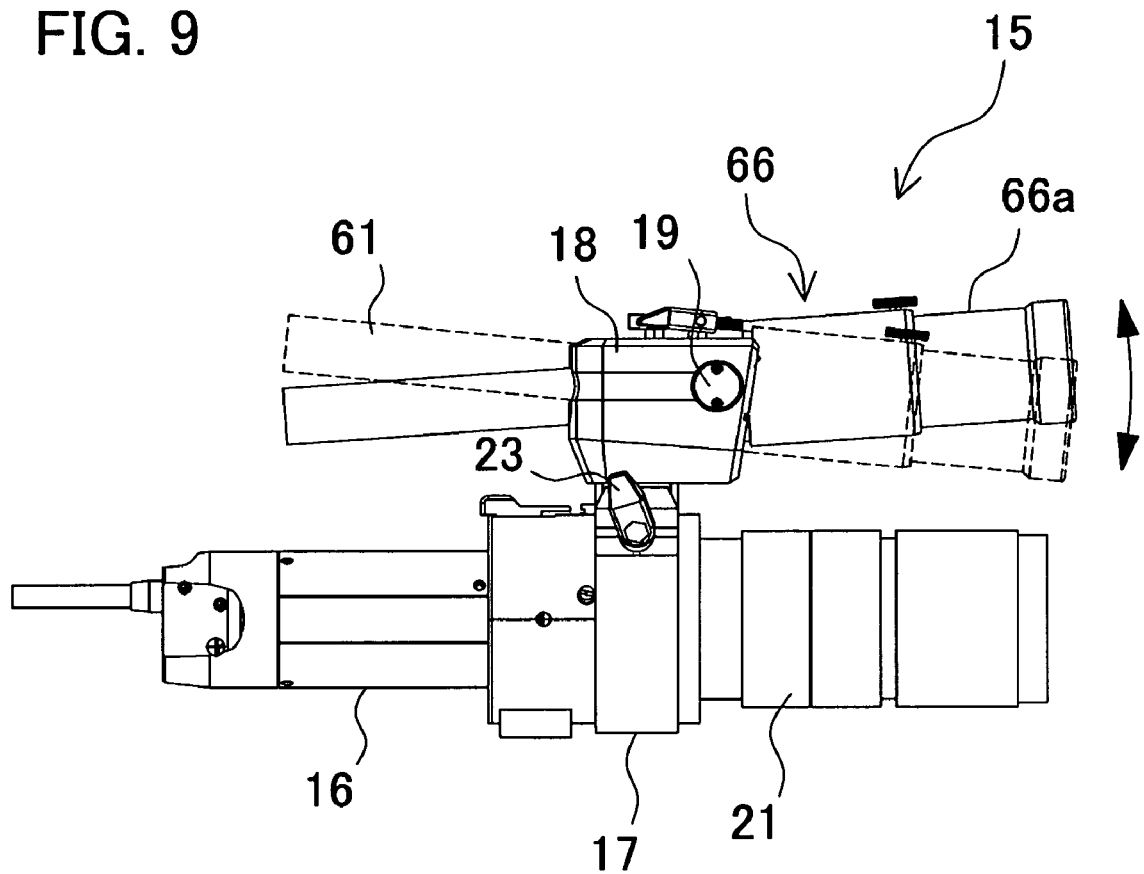
FIG. 9 is a side view showing the state that the first lens illumination unit is tilted.

The head section 15 also includes an illumination unit tilt angle adjusting part for adjusting a tilt angle of the first lens illumination unit 66 relative to the first lens module 21. FIGS. 8A, 8B, 9 and 10 show one example of the illumination unit tilt angle adjusting part. More specifically, FIGS. 8A and 8B are perspective views each showing a state that the first lens illumination unit 66 is tilted. FIG. 9 is a side view showing the state that the first lens illumination unit 66 is tilted. FIG. 10 is a vertical sectional view showing the illumination unit tilt angle adjusting part by a change of a cutting position in FIG. 4, which corresponds to a part of FIG. 9. As shown in these figures, the illumination unit tilt angle adjusting part includes a worm gear 25 provided on the illumination unit mount 18, and a worm wheel 26 provided at the rear end of the first lens illumination unit 66. The worm gear 25 has an end (a top side in FIG. 10) to which a tilt angle adjusting screw 27 is secured. When the tilt angle adjusting screw 27 is rotated, the worm gear 25 is rotated. When the worm wheel 26 engaged with the worm gear 25 is rotated, the first lens illumination unit 66 pivots on the tilting shaft 19. Thus, the illumination unit tilt angle adjusting part can adjust the tilt angle of the first lens illumination unit 66 with respect to the first lens module 21. This configuration brings about the following advantage. That is, even when a user optionally sets a distance between the first lens module and the object S (i.e., a working distance of the illumination light), the tilt angle can readily be set such that the object S is appropriately illuminated in accordance with this distance. The configuration of the worm gear 25 allows precise angle adjustment. Further, since no mechanical power is transmitted from the first lens illumination unit 66, the tilt angle can be kept without provision of a particular securing mechanism. Therefore, the tilt angle can be prevented from being changed due to the self-weight of the first lens illumination unit 66.

As described above, the illumination unit tilt angle adjusting part adjusts the tilt angle of the first lens illumination unit 66 with the use of the worm gear; however, the present invention is not limited thereto. For example, the tilt angle may be adjusted by a combination of a pinion gear and a plate-shaped gear. Moreover, the tilt angle may be adjusted by means of a cam, a crack or the like. Alternatively, the tilt angle may be adjusted by a method for directly turning the first lens illumination unit 66 by means of a stepping motor and a servo motor. In addition, a lock mechanism for keeping the tilt angle may be provided if necessary.

Figure 11A:
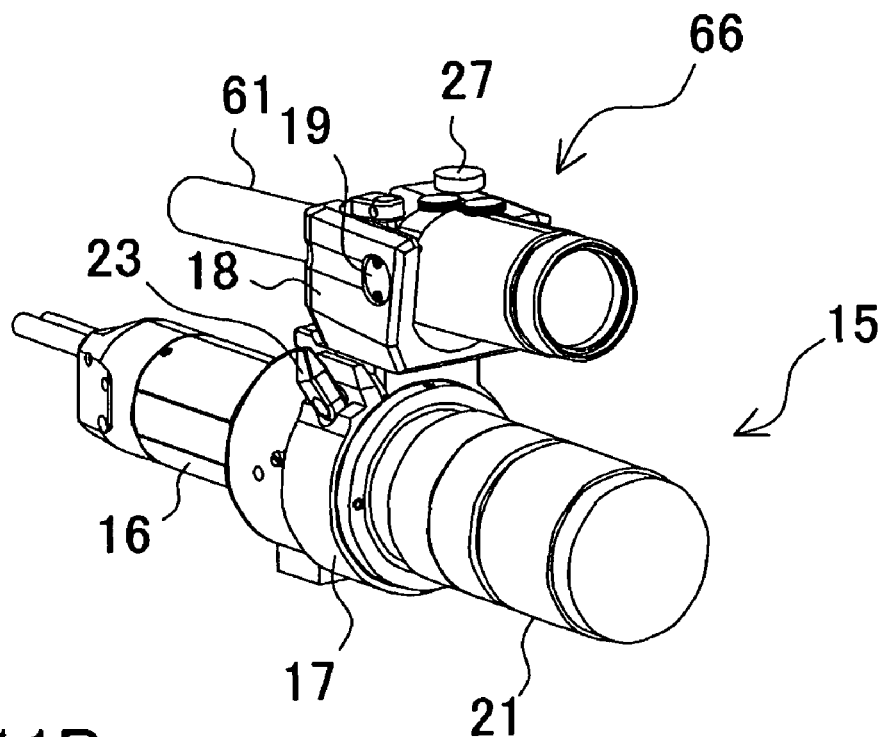
FIGS. 11A and 11B are perspective views each showing a telescope-type lens of the first lens illumination unit.
Figure 11B:
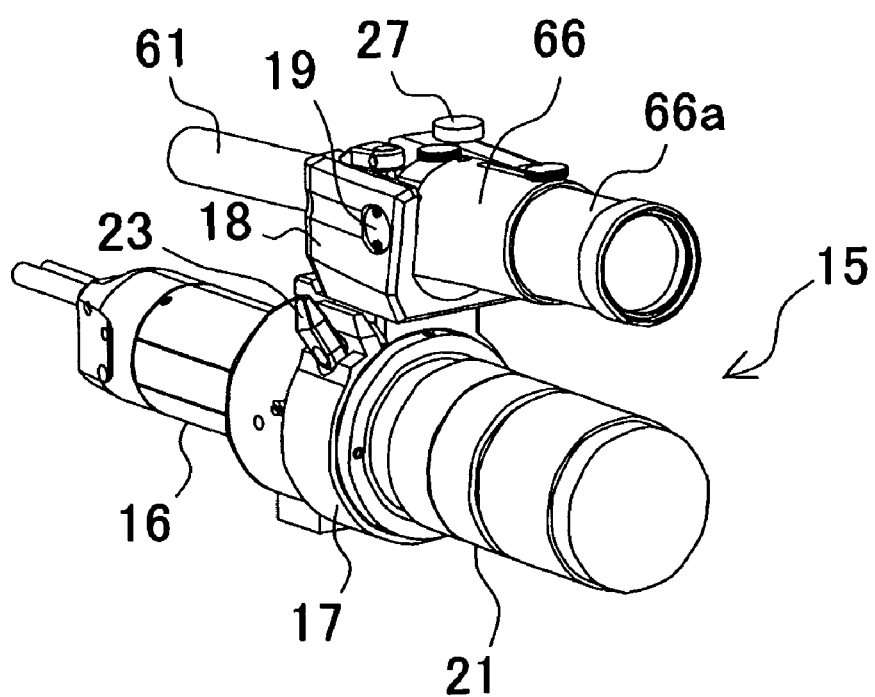

The first lens illumination unit 66 further includes a telescope-type lens 66a which is suitable light projection in order to form spot light. That is, the cylindrical lens portion which is of a telescopic type adjusts a diameter of spot light. The telescope-type lens 66a shown in FIG. 1A can protrude as shown in FIG. 11B. When an amount of protrusion of the telescope-type lens 66a is small, the diameter of the spot light becomes large. On the other hand, when this amount is large, the diameter of the spot light becomes small. Thus, the spot light can be formed by convergence of the illumination light. In the case where the image acquisition apparatus is used for the purpose of use for high-speed image capture, particularly, the working distance of the illumination light is relatively long. Therefore, the illumination light can efficiently be emitted with sufficient illuminance by the emission of the spot light. In this embodiment, the movable portion for adjusting the illumination light is of a telescopic type; however, the present invention is not limited thereto. For example, a combination of a plurality of optical lenses may be made movable inside the first lens illumination unit 66. It is needless to say that the combination of the optical lenses may be set such that the diameter of the spot light becomes larger when the movable portion protrudes. Further, the configuration that the spot diameter of the illumination light is variable brings about an advantage that an appropriate region demanded by a user is illuminated. In addition, sufficient brightness corresponding to a high frame rate suitable for high-speed image capture set by the user can be ensured by a limited quantity of light emitted from the illumination light source in the main body section.

(Illumination Optical Path 67)

Figure 12:
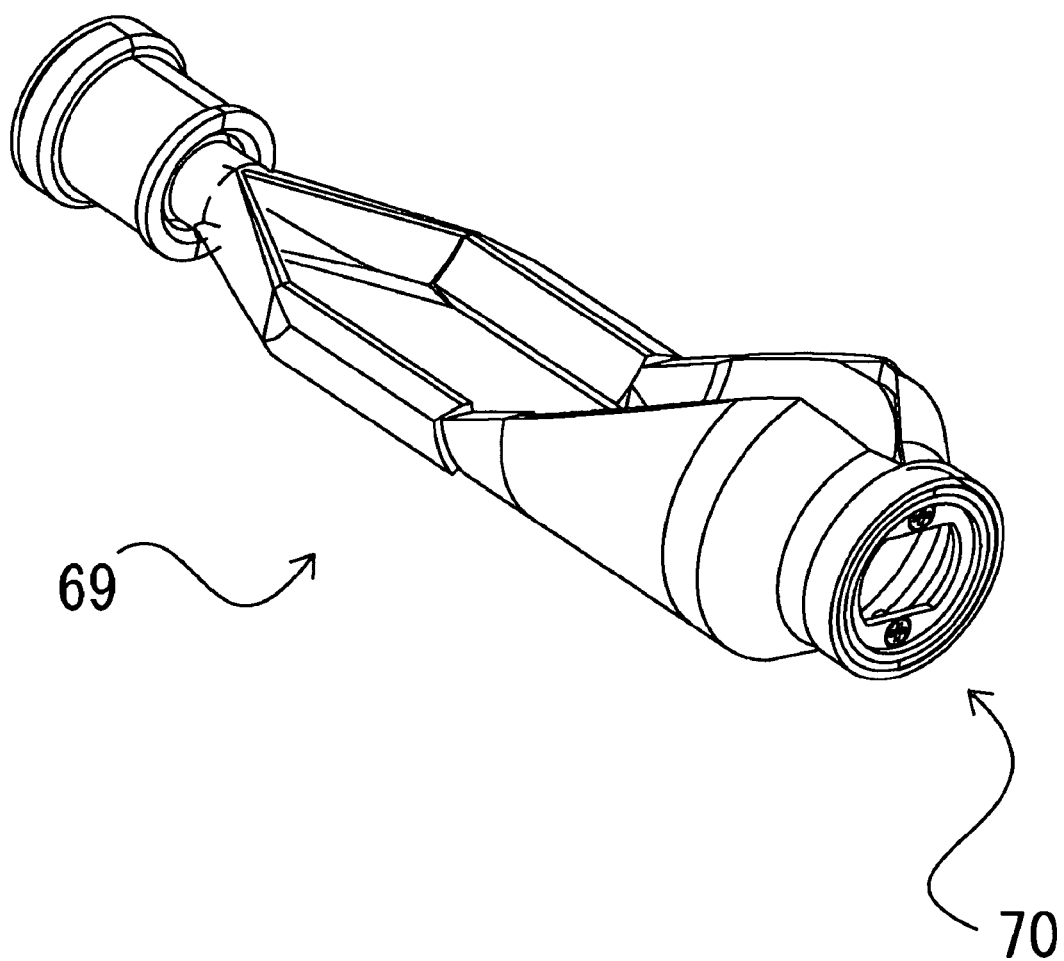
FIG. 12 is a perspective view showing an optical fiber branch path.

As shown in FIGS. 5 and 6, the illumination optical path 67 that emits the illumination light for the second lens module 22 is incorporated in the second lens module 22 in the head section 15. The illumination optical path 67 is a ring-shaped illumination source that branches illumination light from an optical fiber 61A which is one example of the illumination light supply cable 61. The ring-shaped illumination source has a plurality of lighting parts 68 arranged annularly around the head section 15. As shown in the horizontal sectional view of FIG. 6, therefore, the image acquisition module 16 is provided with an optical fiber branch path 69 that branches the illumination light from the illumination light supply cable 61. FIG. 12 is a perspective view showing the optical fiber branch path 69. As shown in the figure, the illumination light from the illumination light supply cable 61 is guided into the image acquisition module 16 from the rear end side of the image acquisition module 16. Then, the guided illumination light is temporarily divided into two directions at the optical fiber branch path 69, and is annularly dispersed at an optical joining surface 70 where a tip end of the image acquisition module 16 is joined to the second lens module 22. As an optical waveguide for guiding the illustration light toward the optical joining surface 70, in this embodiment, the optical fiber is incorporated in the optical fiber branch path 69. The illumination light is temporarily branched in order to dispose the image acquisition part 10 on the center of the image acquisition module 16. The branched illumination light propagates through the optical waveguide of the optical fiber 61A, and then is guided to a circumference portion of the optical joining surface 70 of the image acquisition module 16. At a portion where the image acquisition module 16 is joined to the second lens module 22, further, the optical joining surface 70 of the image acquisition module 16 is optically coupled to the optical joining surface of the second lens module 22, so that the illumination light propagates through the optical waveguide such as the optical fiber 61A incorporated in the second lens module 22, and then is guided to the lighting parts 68 provided at the light receiving end of the second lens module 22.

The plurality of lighting parts 68 each formed into a block shape are annularly provided around the light receiving side of the second lens module 22. The illumination light is shielded at an optional position on the optical waveguide (on the side of the main body section 50 in this embodiment as will be described later) to switch between total illumination in which all the lighting parts 68 light up and one-side illumination in which some of, for example, a quarter of the lighting parts 68 light up. When some of the lighting parts 68 light up, the surface of the observation target is shaded, so that an image to be obtained becomes more stereoscopic with surface irregularities of the object being emphasized. By a change in lighting pattern of the lighting parts 68, a shade of an enlarged image to be obtained can be changed. With the use of this characteristic, a plurality of lighting patterns (e.g., total illumination in which all the lighting parts 68 light up, one-side illumination in which some of, for example, a half of or a quarter of the lighting parts 68 light up, a combination of epi-illumination and transmission illumination, diffusion, presence of a polarization filter, and the like) are prepared in advance. Then, images are simply captured while the lighting patterns are successively changed, and a list of the images is displayed on the display part 52. The user selects favorite one of the images, and a normal enlarged image to be observed is captured at the lighting pattern of the selected image. This configuration brings about the following advantage. That is, the user can readily acquire desired one of the images displayed on the screen of the display part 52 without being conscious of the method of illumination.

In the example shown in FIG. 6, the illumination light supply cable 61 is connected to the image acquisition module 16 in the head section 15, and the illumination light is supplied to the second lens module 22 through the optical fiber branch path 69. However, the present invention is not particularly limited to this example. It is needless to say that the illumination light may be supplied in such a manner that the illumination light supply cable 61 is directly connected to the second lens module 22, for example.

(Coaxial Epi-Illumination Adapter 71)

In a case of performing coaxial epi-illumination, as shown in FIGS. 2A and 2D, a coaxial epi-illumination adapter 71 is attached to the second lens module 22. The coaxial epi-illumination adapter 71 receives the illumination light such that the illumination light, which is made incident from the side face of the second lens module 22 and is reflected by a plurality of mirrors, is almost coincident with an optical axis of the image acquisition device 12. This configuration is effective at bright field observation. As shown in FIG. 2A, herein, the illumination light supply cable 61 is connected to the connector protruding from the side face of the second lens module 22.

(Cable Section 24)

In the cable section 24, on the other hand, the illumination light supply cable 61 connects between the illumination light source 64 in the main body section 50 and the illuminating part 60 in the head section 15 and supplies the illumination light from the illumination light source 64 to the observation target region through the lens module 20 while the signal transmission cable 62 transmits an image acquisition control signal from the image acquisition control part 13 in the main body section 50 to the image acquisition device 12 in the head section 15 and, also, transmits an image signal from the image acquisition device 12 to the image processing part 81 in the main body section 50. The illumination light supply cable 61 may be the optical fiber 61A suitable for transmission of light. The signal transmission cable 62 may be a metal wire excellent in conductivity such as a copper wire suitable for transmission of an electric signal.

The cable section 24 has a first end secured to the head section 15 and a second end connected to the connection terminal of the main body section 50. It is needless to say that the cable section 24 may be attachable to/detachable from the head section 15. In the cable section 24, moreover, the illumination light supply cable 61 and the signal transmission cable 62 may be provided separately such that the respective terminals thereof are connected independently of each other. Alternatively, the illumination light supply cable 61 and the signal transmission cable 62 may be integrated into one or may be partly integrated into one such that the respective connection terminals are branched. On the other hand, terminals holes are provided at the main body section 15 such that the branched connection terminals of the cable section 24 are inserted thereinto.

As shown in FIG. 2A, in the case where the ring-shaped illumination source is provided as the illuminating part 60 in the head section 15 for the purpose of use for enlargement observation, the illuminating part 60 is integrally incorporated in the head section 15. As shown in FIG. 2C, therefore, the cable section 24 has the configuration that the illumination light supply cable 61 and the signal transmission cable 62 are integrated into one. The cable section 24 has one end secured to the rear end of the image acquisition module 16 of the head section 15. In the cable section 24, on the other hand, the illumination light supply cable 61 and the signal transmission cable 62 are branched at the side to be connected to the main body section 50. Moreover, the signal transmission cable 62 is divided into the pixel shifting signal cable 62A for transmitting a pixel shifting signal and a control signal cable 62B for transmitting a control signal and an image signal. FIG. 2C shows the state that the head section 15 is connected to the main body section 50 through the cable section 24 configured as described above. The configuration that the illumination light supply cable 61 and the signal transmission cable 62 are integrated into one to a certain degree in the cable section 24 facilitates a routing operation. However, the illumination light supply cable 61 and the signal transmission cable 62 are not necessarily integrated into one in the cable section 24. As shown in FIG. 3C, for example, the illumination light supply cable 61 and the signal transmission cable 62 (the pixel shifting signal cable 62A, the control signal cable 62B) may directly be branched from the head section 15, and may be connected to the main body section 50, respectively.

In the case where the separate illuminating part 60 is attached to the head section 15, on the other hand, the illumination light supply cable 61 and the signal transmission cable 62 in the cable section 24 are not necessarily integrated into one. Therefore, the illumination light supply cable 61 is directly connected to the illuminating part 60 and the main body section 50. As shown in FIGS. 2A and 2B, more specifically, the illumination light supply cable 61 has a first end connected to the rear end of the first lens illumination unit 66 and a second end connected to the main body section 50, in the head section 15 for the purpose of use for high-speed observation. As shown in FIGS. 2A and 2B, herein, the cable section 24 in which the illumination light supply cable 61 and the signal transmission cable 62 are partly integrated into one may be used at the side of the image acquisition module 16. As shown in FIG. 2B, in the cable section 24, the illumination light supply cable 61 connected to the image acquisition module 16 is not connected to the main body section 50, but the illumination light supply cable 61 connected to the first lens illumination unit 66 is connected to the main body section 50.

As shown in FIG. 3D, in the case where the coaxial epi-illumination source is used as the illuminating part 60 in the head section 15 for the purpose of use for enlargement observation, the first end of the illumination light supply cable 61 is connected to the coaxial epi-illumination adapter 71 through an epi-illumination coupler 72 while the second end of the illumination light supply cable 61 is connected to the main body section 50. Thus, the illumination light can be transmitted from the illumination light source 64 in the main body section 50 to the illuminating part 60. Also in this case, the cable section 24 on the side of the image acquisition module 16 may have the configuration that the illumination light supply cable 61 and the signal transmission cable 62 are partly integrated into one. As shown in FIG. 2D, in the cable section 24, the illumination light supply cable 61 connected to the image acquisition module 16 is not connected to the main body section 50, but the illumination light supply cable 61 connected to the coaxial epi-illumination adapter 71 is connected to the main body section 50.

FIGS. 1, 2C and 2D show the case of using the epi-illumination source; however, the present invention is not limited thereto. It is needless to say that a transmission illumination source may be used instead of the epi-illumination source. In a case of using the transmission illumination source, an illuminating part is disposed on a back side of the object, and an image of the object is captured while the object is illuminated from its back side.

(Main Body Section 50)

The main body section 50 includes a memory part 53 and an interface part 54 in addition to the illumination light source 64, the image acquisition control part 13 and the image processing part 81. In the example shown in FIG. 1, these components are incorporated in the main body section 50; however, the configuration of the main body section 50 is not limited to this example. For example, the illumination light source 64, the image acquisition control part 13, the image processing part 81 and the like may be divided on a unit basis, respectively. This configuration increases the degree of freedom. For example, the illumination light source 64 is not incorporated in the main body section 50, but is externally connected to the main body section 50. In this case, the user can readily perform a light source switching operation, but must install a separate light source and perform an additional wiring operation at much expense in time and effort.

(Illumination Light Source 64)

The image acquisition control part 13 controls the lighting operation by the illumination light source 64. Specifically, in a case of using a metal halide lamp or a halogen lamp as the illumination light source, a masking plate (not shown) that masks the illumination light completely or partly is disposed on an optical path to the connection terminal for connection of the illumination light supply cable 61. The masking plate has a large plate and a small plate which are formed into a substantially sector shape and are connected back to back with each other. The masking plate is disposed on the optical path so as to pivot on a pivoting shaft. The larger sector plate has a substantially circular-shaped opening window for total illumination and a substantially sector-shaped opening window for one-side illumination. The smaller sector plate has a gear groove formed at its circumferential side face. The masking plate is connected to a motor so as to pivot on the pivoting shaft. The motor has a rotating shaft to which a worm gear is secured. The worm gear has a gear portion engaged with the gear groove formed at the circumference of the smaller sector plate of the masking plate. When the motor is driven so that the masking plate pivots, one of the opening window for total illumination and the opening window for one-side illumination matches with the illumination light supply cable 61. Thus, the illumination light supply cable 61 is connected to the illumination light source 64, so that the illuminating part 60 can emit the illumination light.

Figure 13:
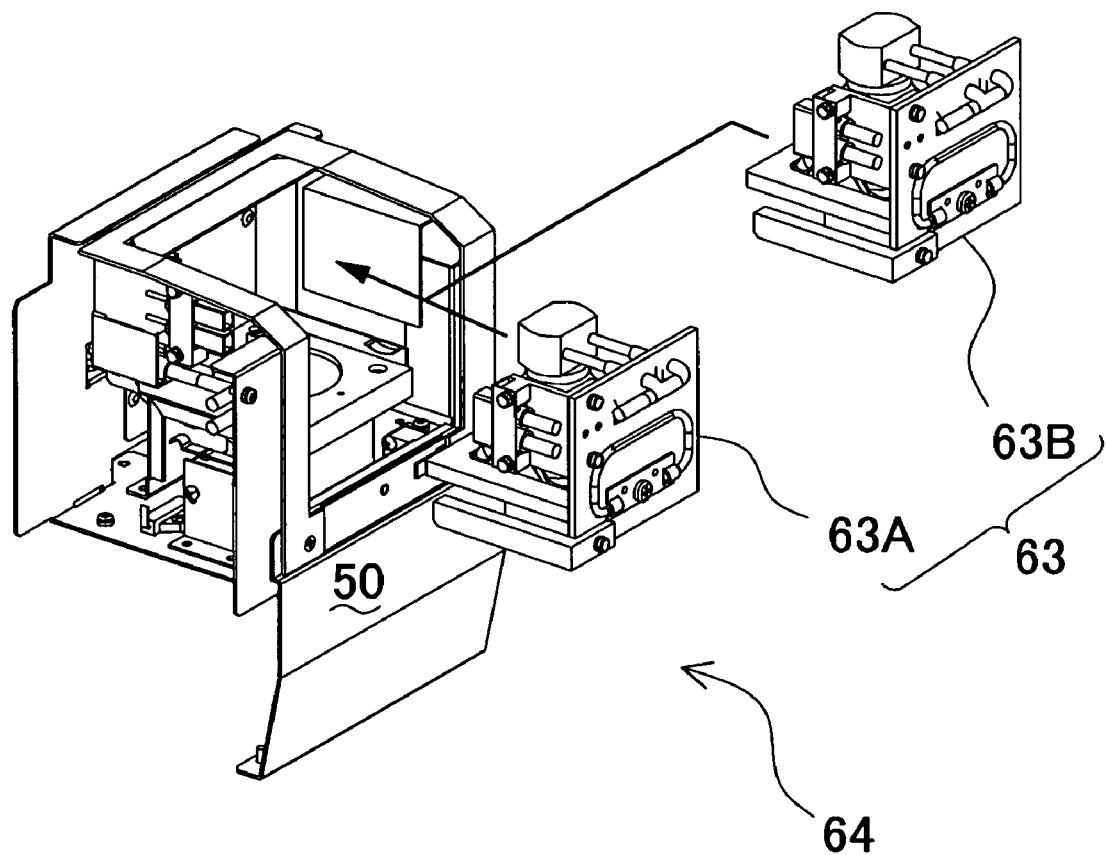
FIG. 13 is a perspective view showing a configuration that one of a plurality of light source units is attached to a main body section in an exchangeable manner.
Figure 14:
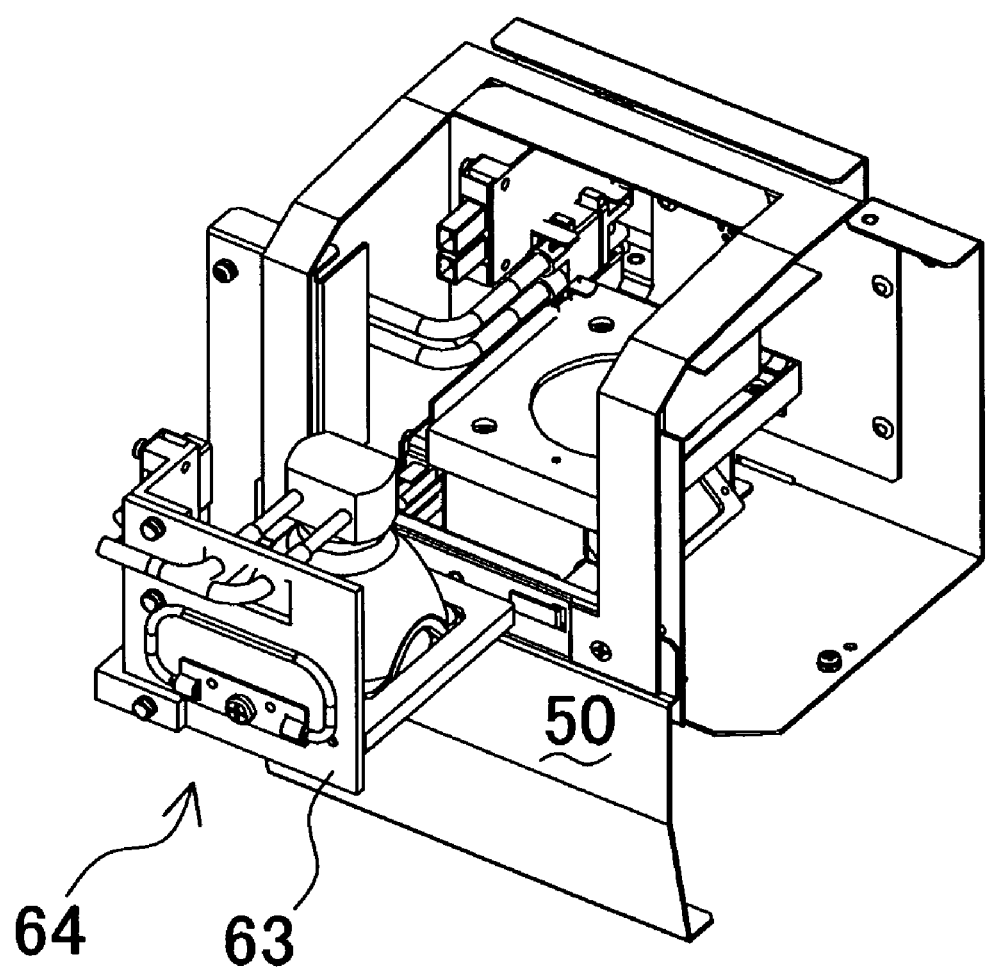
FIG. 14 is a perspective view showing, at another angle, a state that the light source unit is detached from the main body section.
Figure 15:
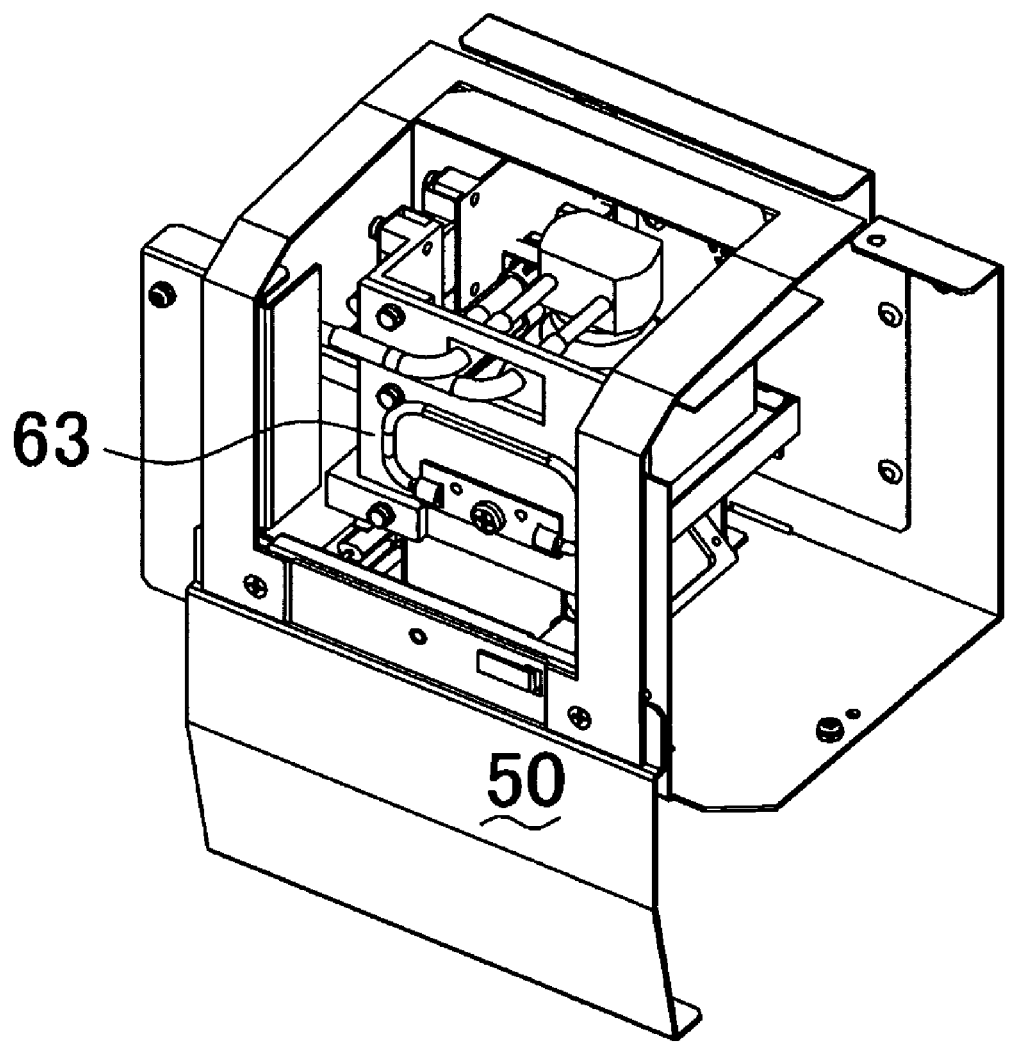
FIG. 15 is a perspective view showing a state that the light source unit is attached to the main body section from the state shown in FIG. 14.

A plurality of different light sources may be selectively used as the illumination light source 64. Herein, the illumination light source 64 is provided on a unit basis, and is attached to/detached from the main body section 50. FIG. 13 is a perspective view showing a state that one of a plurality of light source units 63A and 63B (hereinafter, collectively referred to as a light source unit 63 in some cases) is selectively attached to the main body section 50. FIG. 14 is a perspective view showing a state that the light source unit 63 is detached from the main body section 50. FIG. 15 is a perspective view showing a state that the light source unit 63 is attached to the main body section 50. The respective light source units 63A and 63B are identical to each other in terms of a shape of an attachment portion, and a light emitting substance in each light source unit is changeable. As described above, the illumination light source 64 is provided on a unit basis so as to facilitate attachment/detachment thereof, that is, the plurality of illumination light sources 63A and 63B which are different in characteristic from each other are prepared. As a result, the illumination light source 64 can be exchanged with suitable one in accordance with the purpose of use. In this example, a first light source which is used for high-speed observation and is high in illuminance and a second light source which is used for enlargement observation, is lower in illuminance than the first light source and is high in color rendering are prepared as the light source unit 63A and the light source unit 63B, respectively. In particular, since a light source that improves both of illuminance and color rendering can not be obtained with ease, the first light source which is high in illuminance is used for the purpose of use for high-speed observation requiring high illuminance while the second light source which is excellent in color rendering rather than illuminance is used for the purpose of use for enlargement observation requiring little illuminance, so that illumination light suitable for the respective purposes of use can be obtained. Moreover, since the light sources are switched in a removable manner in accordance with the purpose of use, a high-quality image can be obtained in each scene. However, the present invention is not particularly limited to this example. For example, a plurality of light sources may be incorporated in the main body section such that lighting operations are switched, which eliminates physical exchange of the light sources. The configuration using the switchable light sources has an advantage that the type of the light source can be changed at one touch of a button, but has a disadvantage that the main body section incorporating the plurality of light sources therein becomes large in size. Alternatively, the light sources are not incorporated in the main body section, but are externally connected to the main body section. In this case, the user can readily perform a light source exchanging operation, but must install a separate light source at much expense in time and effort.

As the illumination light source 64 described above, a metal halide lamp can be used preferably. The metal halide lamp is different from a halogen lamp that emits light in such a manner that current is fed to a filament. For example, the metal halide lamp emits light in such a manner that high-tension current is discharged onto a bulb filled with xenon gas. Specifically, the metal halide lamp is a high-intensity discharge lamp into which mercury and halogenated metal are sealed. In a light emitting tube, mercury, rare gas and light emitting metal are sealed in a form of a halide (principally, an iodide). Advantageously, this lamp is long in lifetime, is excellent in energy efficiency, is low in power consumption, and is high in illuminance. In the purpose of use for high-speed observation, particularly, a working distance becomes longer in comparison with the case of the purpose of use for enlargement observation. Further, an image can be captured on an extremely short frame basis. Therefore, high-power illumination is required in order to achieve satisfactory illuminance. For this reason, the metal halide lamp is preferably used for the purpose of use for high-speed observation. In addition, the metal halide lamp may be used for the purpose of use for enlargement observation. In this case, illuminance to be required is lower than that for the purpose of use for high-speed observation. Therefore, a metal halide lamp which is low in illuminance, but is high in color rendering, specifically, a halide lamp which is high in red color component is used for the purpose of use for enlargement observation. In addition to the metal halide lamp, alternatively, a mercury lamp or a xenon lamp may be used as the first light source while a halogen lamp or an LED may be used as the second light source. The LED is smaller in amount of infrared components than the halogen lamp, the metal halide lamp and the like. In comparison with the halogen lamp, the metal halide lamp and the like, therefore, the LED has an advantage that an amount of heat to be applied to an object is low even when an identical quantity of light is emitted to the object. Moreover, the LED can be obtained at relatively low cost, is long in lifetime, and is excellent in response to an input operation. In addition, a lighting operation by the LED can be controlled without use of a masking plate for masking the illumination light, that is, the LED can be tuned on/off while following high-speed image capture of 1000000 fps.

(Light Source Determining Part 65)

In order to appropriately drive the different illumination light sources 64, driving conditions such as driving current can be changed in accordance with the type of the illumination light source 64 to be connected to the main body section 50. This change can be performed manually or automatically. As shown in FIG. 1, particularly, the main body section 50 includes a light source determining part 65 that determines the type of the attached illumination light source 64. By provision of the light source determining part 65, the main body section 50 automatically grasps the type of the illumination light source 64 connected thereto. As a result, appropriate driving conditions for driving each light source can be selected, so that the attached illumination light source 64 can be driven and controlled appropriately. For example, a driving current value can be changed and output of the illumination light can be controlled in accordance with a metal halide lamp. This configuration eliminates an effort of changing a power supply wattage and, also, prevents erroneous settings by a user. Thus, each illumination light source 64 can be used with certainty in safety. Further, the following configuration may be adopted. That is, the main body section 50 calculates a lighting time of each illumination light source 64, retains an accumulative use period of time for each illumination light source 64, and encourages to replace the illumination light source 64 when the replacement timing approaches.

(Optical-Coupling Correcting Part)

Figure 16:
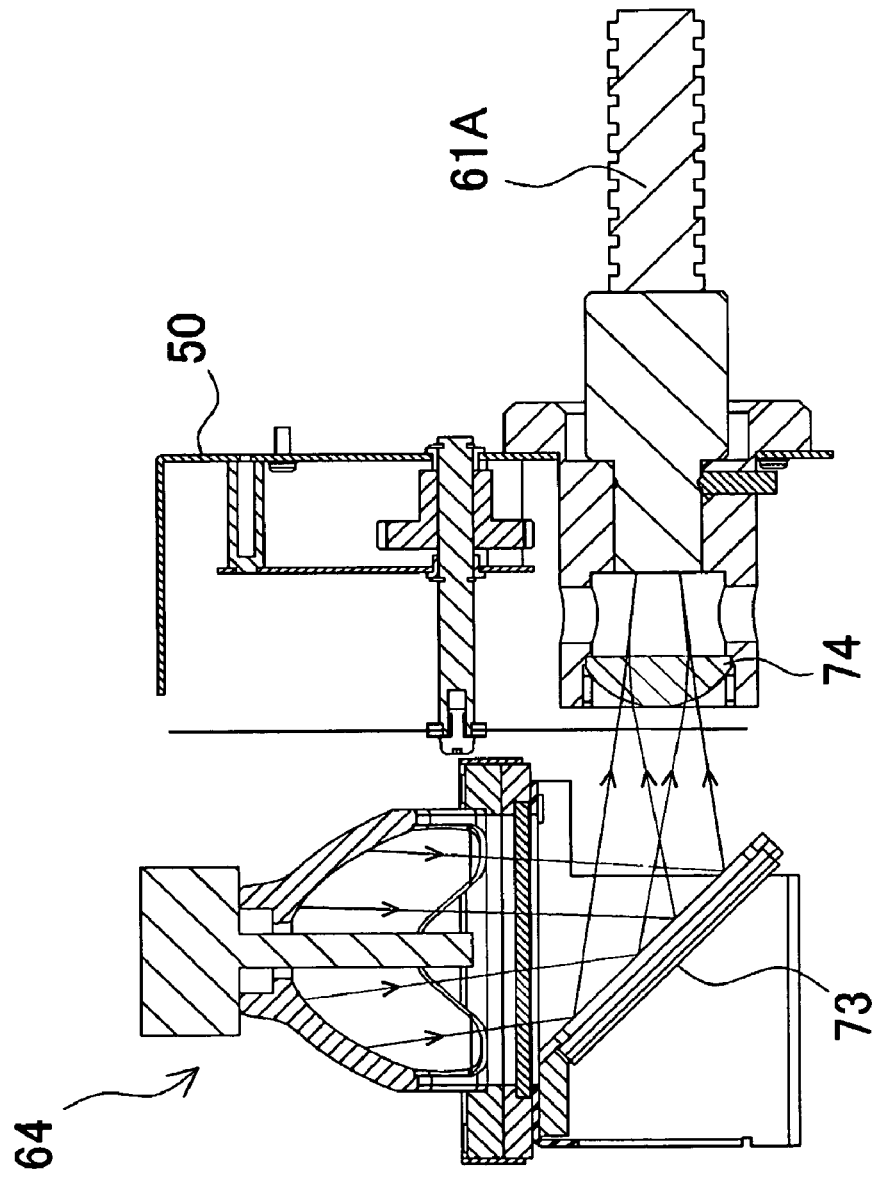
FIG. 16 is a sectional view showing an optical coupling portion between the illumination light source and the illumination light supply cable.

FIG. 16 is a sectional view showing an optical coupling portion between the illumination light source 64 and the illumination light supply cable 61. As shown in the figure, the illumination light emitted from the illumination light source 64 is reflected by a mirror 73, and then is optically coupled to the end face of the optical fiber 61A which is one example of the illumination light supply cable 61A.

Figure 17:
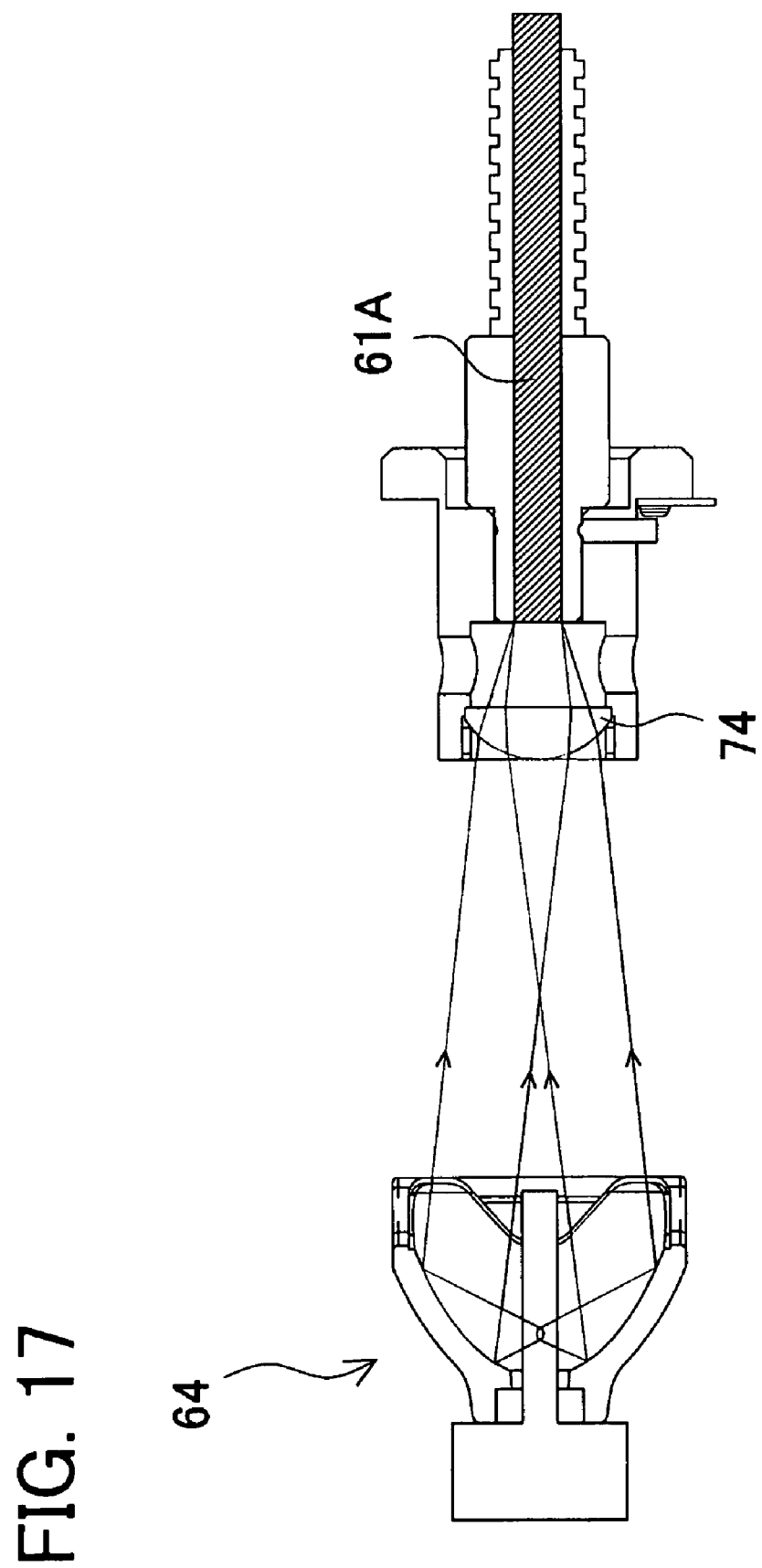
FIG. 17 is a sectional view showing a configuration that the illumination light source includes an optical-coupling correcting part.

FIG. 17 is a sectional view showing a structure of a light source that solves a problem of hollow defective illumination by means of an optical-coupling correcting part for correcting the light emitted from the light source at the optical coupling portion between the illumination light source 64 and the illumination light supply cable 61. As shown in FIG. 23, conventionally when the light collecting lamp 75 directly collects light for the end face of the optical fiber 61A, the light emitted from the illumination light source 64 through the reflector 76 is split into two in directions shown by arrow marks A and B due to the presence of the light emitting tube, so that the center portion is shaded, that is, so-called hollow defective illumination occurs. This problem particularly becomes obvious as the working distance WD becomes long.

Figure 18:
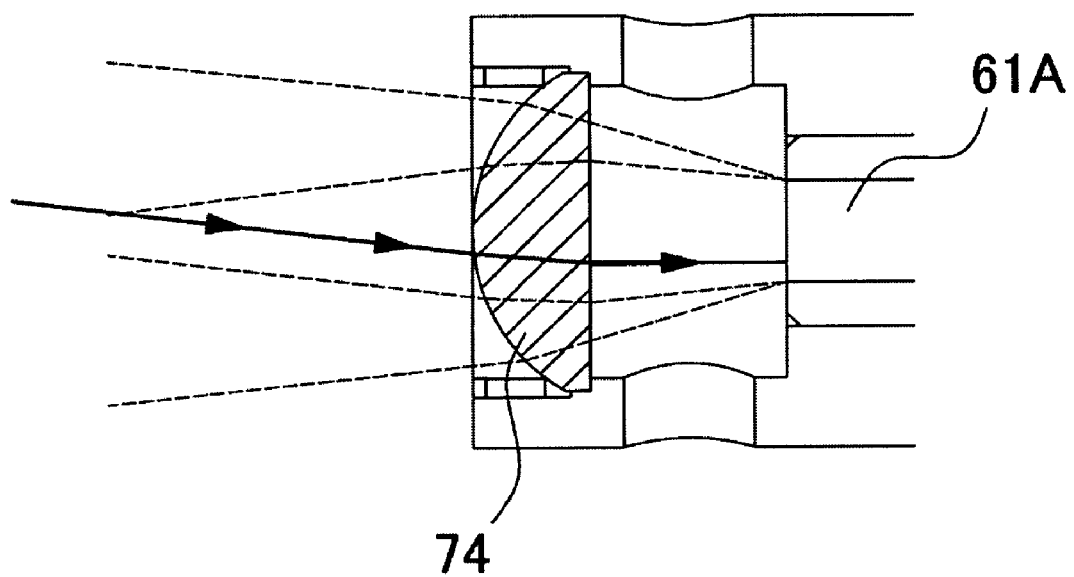
FIG. 18 is an enlarged sectional view showing a portion in the vicinity of a front-side focal point in FIG. 17.

In this embodiment, on the other hand, the branched light beams are collected so as to be directed to the optical axis direction of the optical fiber 61A. As shown in the sectional view of FIG. 17, more specifically, a plano convex lens 74 which is one example of the optical-coupling correcting part is interposed between the light collecting lamp, which is one example of the illumination light source 64, and the end face of the optical fiber 61A. As shown in the enlarged sectional view of FIG. 18, the piano convex lens 74 is disposed such that the light passes through a front-side focal point (a point on an optical axis which is conjugated to a certain physical point at infinity rearward a camera) of the plano convex lens 74, so that a flux of the light emitted from the light collecting lamp partly generates light having a component parallel with the optical axis. Thus, since the light emitted from the optical fiber 61A has a component in the optical axis direction at the optical fiber 61A, the so-called hollow defective illumination is suppressed. Even when a distance between the lamp and the optical fiber is long, the plano convex lens 74 allows collection of the light leading to increase of a quantity of light to be made incident onto the optical fiber 61A. For the sake of description, each of the sectional views of FIGS. 17 and 23 shows the state that the light is split into two. In actual, the light is emitted stereoscopically in a cylindrical form. In the light, therefore, a center portion becomes dark. In other words, the emitted light has an annular shape. For the sake of description, the mirror is not shown in FIG. 17. Herein, the mirror is not necessarily provided on the optical path as shown in FIG. 16.

(Image Acquisition Control Part 13)

The image acquisition control part 13 sets image acquisition conditions such as a frame rate and a shutter speed in high-speed observation through the operation part 55, and controls the respective components in accordance with the set image acquisition conditions. Specifically, the image acquisition control part 13 generates an image acquisition control signal for driving and controlling the image acquisition device 12 of the image acquisition part 10, and then transmits the image acquisition control signal to the image acquisition part 10. Moreover, the image acquisition control part 13 controls an ON/OFF state and shielding of the illumination light source 64. In an image capturing operation using an electronic flash, for example, the image acquisition control part 13 outputs a synchronization signal in synchronization with the image capturing operation, turns the illumination light source 64 on/off in accordance with the synchronization signal, and allows the image acquisition device 12 to capture an image brought into synchronization with the synchronization signal. As described above, the image acquisition control part 13 transmits, to the illumination light source 64, image acquisition timing signals brought into synchronization with a start timing and an end timing in one image capturing operation and an exposure timing signal brought into synchronization with an exposure start timing in each frame during the image capturing operation. In the enlargement observation, moreover, as the setting of the image acquisition conditions, one of the epi-illumination light and the transmission illumination light is selected as, for example, the light to be emitted from the ring-shaped illumination source, and then one of the total illumination and the one-side illumination are set for the respective pieces of light. Further, an illuminating method can be changed variously by a combination of a plurality of conditions such as diffusion or polarization as a filter, and transmission without using the filter. These settings are performed by the user through the operation section 55

(Image Processing Part 81)

The image processing part 81 performs an imaging process on an enlarged image captured by the image acquisition part 10. For example, the image processing part 81 designates a region of an image of the object, which is displayed on the display part 52, to calculate an area of this designated region. Further, the image processing part 81 calculates a difference in height, a distance and an angle.

(Display Part 52)

The display part 52 is a display that displays a captured image, a setting and the like. The display part 52 is, for example, a CRT or a liquid crystal panel. As shown in FIGS. 2A to 2D and 3A to 3D, for example, the display part 52 is incorporated in the main body section 50.

(Memory Part 53)

The memory part 53 retains data of a captured image, details of a setting, and the like. Preferably, a high-speed semiconductor memory such as a RAM is used as a temporal storage region, and a hard disk drive is used as a data saving region.

(Interface Part 54)

The interface part 54 is provided for exchanging data with an external appliance through an IO or communication. As a port for exchanging control signals and image data with the external appliance, the terminal holes for connection of the cable section 24 and various connectors are formed on the main body section 50. In addition, provision of a USB port facilitates writing of data to a USB memory, and data communication with another computer by serial connection.

(Operation Part 55)

The operation part 55 is an input/output device through which the user conducts various operations such as an input operation on the basis of a screen displayed on the display part 52. The operation part 55 is connected to the main body section 50 in a wired manner or in a wireless manner. Alternatively, the operation part 55 is secured to the main body section 50. Typical examples of the operation part 55 may include various pointing devices such as a mouse, a keyboard, a slide pad, a trackpoint, a tablet, a joystick, a console, a jog dial, a digitizer, a light pen, a numeric key pad, a touch pad and a pointing stick. Further, the operation part 55 is used for operating the image acquisition apparatus. Additionally, the operation part 55 is used for operating the image acquisition apparatus itself and peripheral appliances. With the use of a touch screen or a touch panel as a display that displays an interface screen, the user can input a command for the operation through a direct touch of the screen by his/her hand. Alternatively, the user may input a command by voice or may use an existing input part. The existing input part may be used together with the operation part 55 described above. Herein, the display part 52 and the operation part 55 may be integrally incorporated in the main body section 50. Alternatively, the display part 52 and the operation part 55 may be externally connected to the main body section 50 in a wired manner or in a wireless manner. In a case where the display part is a touch panel, such a display part may be integrated with the operation part 55. In FIGS. 2A to 2D and 3A to 3D, for example, the operation part 55 is a console connected to the main body section in a wireless manner.

(Purpose of Use for High-Speed Observation)

Hereinafter, description will be given of details of an image capturing operation for the purpose of use for enlargement observation and details of an image capturing operation for the purpose of use for high-speed image capture each performed by the image acquisition apparatus. First, description will be given of the image capturing operation for the purpose of use for high-speed observation. As shown in FIGS. 2A to 2D, the image acquisition module 16 incorporating therein the image acquisition device 12 for color image capture or monochrome image capture is selected as the head section 15 of the image acquisition apparatus, and the first lens module 21 is attached to the tip end of the image acquisition module 16. Herein, the image acquisition module 16 is optically joined to the first lens module 21 such that the optical axis of the image acquisition device 12 incorporated in the image acquisition module 16 matches with the optical axis of the first lens module 21. Further, the first lens illumination unit 66 which is one example of the illuminating part 60 is attached to the image acquisition module 16 or the first lens module 21. As described above, the first lens illumination unit 66 is provided independently of the first lens module 21, and is attached to the head section 15. Therefore, an illuminating fixture for high-speed observation can be readily prepared unlike the conventional technique that a separate illuminating fixture has been prepared absolutely. Further, an adjusting operation is simplified by the illumination unit tilt angle adjusting part. In FIGS. 2A to 2D, the first lens module 21 to which the first lens illumination unit 66 is integrally secured in advance is prepared. Therefore, only the first lens module 21 can be attached to the head section 15, leading to facilitation of handling. It is needless to say that the first lens illumination unit may be attachable to/detachable from the first lens module.

(Operation Screen)

Figure 19:
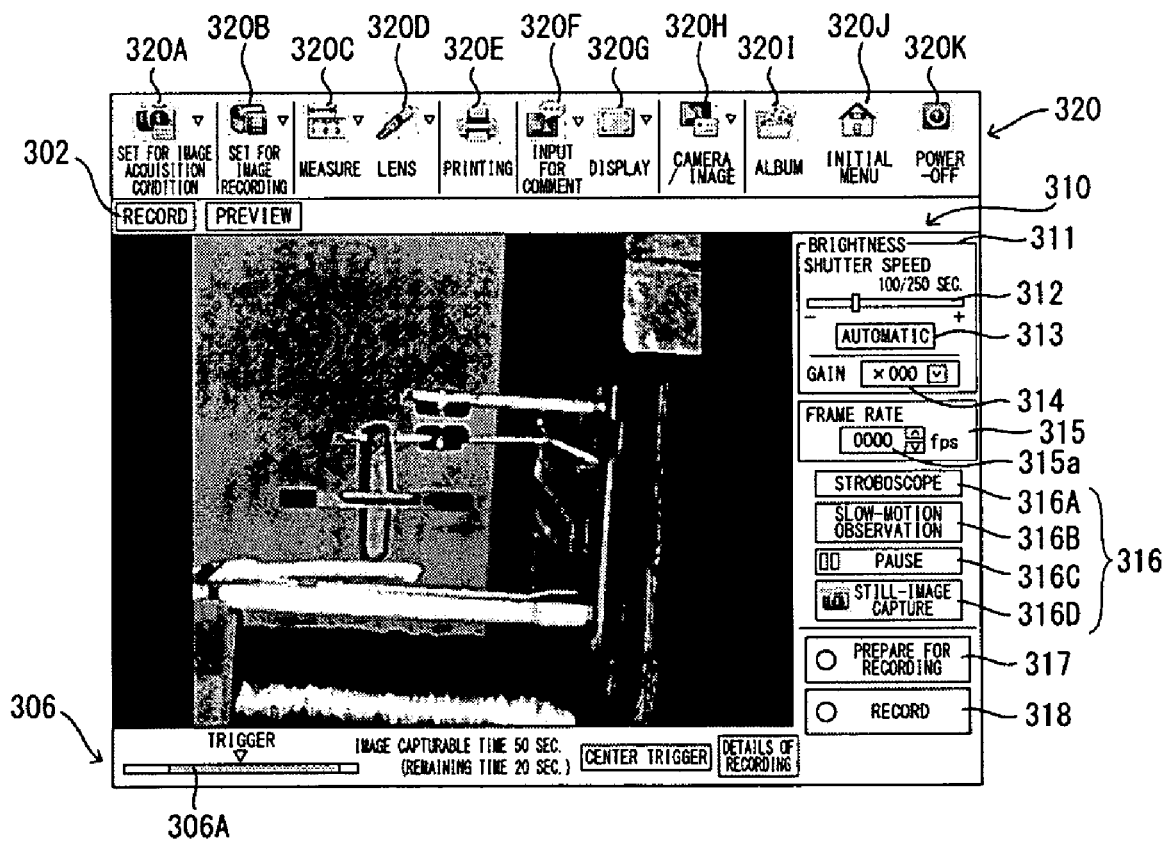
FIG. 19 shows a recording screen of an image acquisition apparatus operating program.
Figure 20:
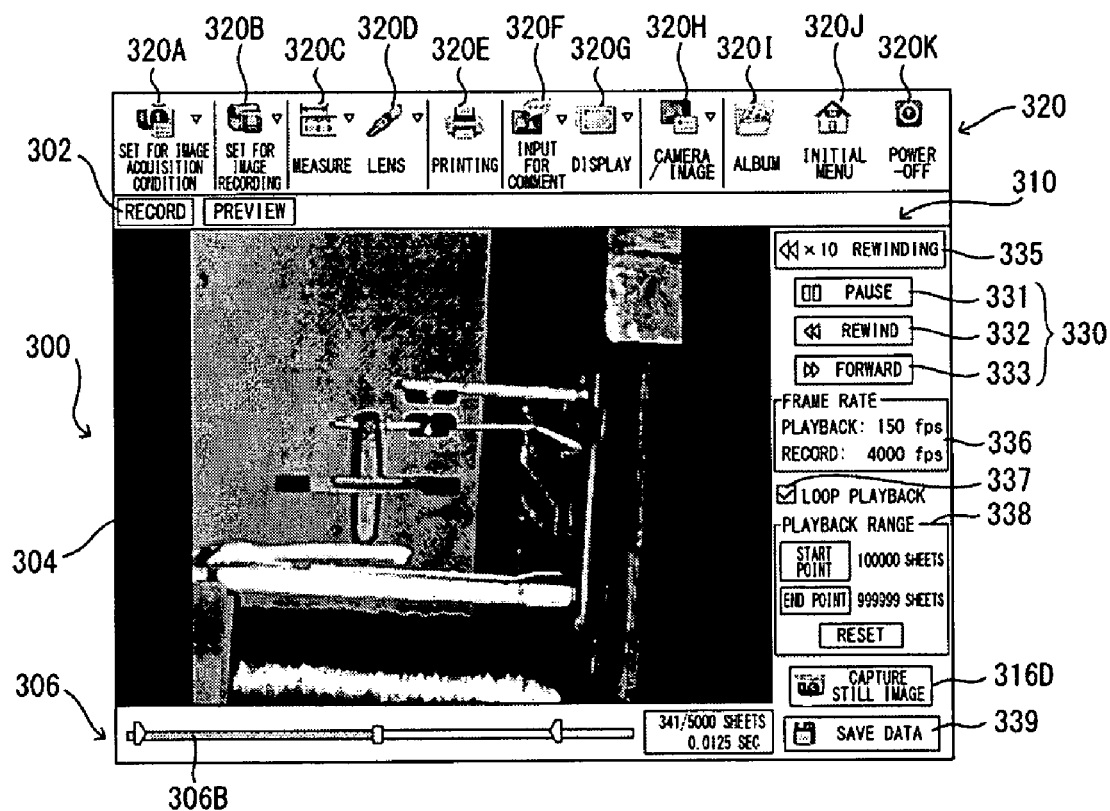
FIG. 20 shows a preview screen of the image acquisition apparatus operating program.

With reference to FIGS. 19 and 20, next, description will be given of a setting procedure for high-speed observation. FIGS. 19 and 20 show one example of a user interface screen 300 of an image acquisition apparatus operating program for operating the image acquisition apparatus. More specifically, FIG. 19 shows a recording screen for high-speed image capture, and FIG. 20 shows a preview screen for playback of recorded data of an image captured at a high speed. In this program, the data of the image captured at a high speed in the recording screen is displayed on the preview screen. Herein, switching between the recording screen and the preview screen is performed by selection of a "Record" button or a "Preview" button which is one example of a screen switching part 302 provided at an upper left side of the screen. Basically, the high-speed image capture refers to an operation of successively capturing still images. Herein, the still images displayed successively are defined as a moving image. Therefore, the high-speed image capture is also referred to as moving-image recording for convenience.

In the user interface screen of this program, the user performs an ON/OFF operation, a numeric value input operation, a command input operation and the like on buttons and input fields which are provided virtually, through the operation part 55 connected to the image acquisition apparatus on which the image acquisition apparatus operating program is installed or a computer on which the image acquisition apparatus operating program is installed. In this specification, a term "depression" covers physical touch of the button, and pseudo depression by click or selection in the operation part 55.

As shown in FIGS. 19 and 20, in the image acquisition apparatus operating program, an image display region 304 for displaying an image, an operation region 310 for performing various operations, which is provided at a right side of the image display region 304, and a tool bar 320 for performing various settings, which is provided at an upper side of the image display region 304, are displayed on the user interface screen. In addition, the screen switching part 302 is provided between the tool bar 320 and the image display region 304. Further, a status region 306 for displaying a current status is provided below the image display region 304. The image display region 304 displays a captured image. Herein, a relay setting apparatus is displayed as the object S.

Herein, description will be given of the recording screen shown in FIG. 19. The operation region 310 includes a brightness setting field 311 for setting brightness, a frame rate setting field 315 for setting a frame rate, and an operation button group 316 for performing the various operations. In the brightness setting field 311, the user can set a shutter speed and a gain. The shutter speed can be continuously set by a slide bar 312. By depression of an "Automatic" button 313, the calculated shutter speed can be automatically set at an appropriate value. Further, the gain can be set as a numeric value in the numeric value display field 314. By depression of a drop button provided at a right side of the numeric value display field 314, a numeric value of the gain, which has been set in advance, is displayed as a dropdown menu. Further, the frame rate can also be set as a numeric value in a numeric value display field 315a of the frame rate setting field 315. By depression of a spin button provided at a right side of the numeric value display field 315, the numeric value of the frame rate can be incremented/decremented.

The operation button group 316 includes a "Stroboscope" button 316A for periodically emitting strong illumination light to the object and capturing an image in synchronization with this light emission, a "Slow-motion image capture" button 316B for capturing an image in slow motion, a "Pause" button 316C for pausing an image capturing operation, a "Still-image capture" button 316D for capturing a still image, a "Recording preparation" button 317 for preparing for a recording operation, and a "Recording" button 318 for starting/stopping the recording operation.

The status region 306 displays an image capturable time and a remaining time. In the status region 306, a time gauge 306A displays a relation between a timing of setting a trigger and an image capturing time. In the example shown in FIG. 19, the trigger is set at a center of the gauge. When a trigger is inputted during a period that images are successively captured in a pre-trigger, such an image capturing operation is continued such that the timing of trigger is set at the center. Then, the image capturing operation is completed automatically. The trigger described above may be set at a start trigger indicative of a timing of starting an image capturing operation, an end trigger indicative of a timing of completing the image capturing operation, a manual trigger for manually designating the timing of stating the image capturing operation and the timing of completing the image capturing operation, and the like.

The tool bar 320 includes an image capturing operation setting button 320A for principally setting conditions for capturing a still image, a recording operation setting button 320B for principally setting conditions for recording a moving image, a measurement button 320C for measuring various setting values such as an area and a distance of a captured image, a lens button 320D for determining a lens module 20 to be used for capturing an image, a print button 320E for printing an image, a comment input button 320F for adding an optional comment of a user to an image, a display button 320G for displaying an image, a camera/image button 320H for making a setting for the image acquisition device 12 and a setting for an image to be captured, an album button 3201 for sorting out captured images and, then, allowing the user to view the images, an initial menu button 320J for setting an initial menu to be displayed at the time of activation of the image acquisition apparatus operating program, and a power source button 320K for turning the image acquisition apparatus on/off.

The various settings are made on the recording screen described above, and then the images are captured at a high-speed. Data of the captured image are displayed on the preview screen. With reference to FIG. 20, next description will be given of the preview screen. The screen shown in FIG. 20 is almost similar to that shown in FIG. 19 in terms of a basic layout. That is, the preview screen also includes an image display region 304, an operation region 310, a tool bar 320, a screen switching part 302 and a status region 306. Buttons in the tool bar 320 are similar to those shown in FIG. 19.

The status region 306 includes a time gauge 306B indicating that, of data of images captured at a high-speed, data of what number of images (the number of frames) is displayed on the display region at present. At a right side of the time line, the total number of frames, a frame number of a displayed frame, and an elapsed time are displayed.

In the operation region 310 of the preview screen, an operation button group 330 includes a playback/pause button 331 for playing back a recorded moving image, a rewind button 332, and a forward button 333. At an upper side of the operation button group 330, an operation state display field 335 is provided for displaying an operation state at present ("×10 Rewinding" in the example shown in FIG. 20). At a lower side of the operation button group 330, a frame rate display field 336 is provided for displaying a frame rate at the time of an image capturing operation "Recording: 4000 fps", a frame rate at the time of an image displaying operation "Playback: 150 fps", or the like. As described above, the frame rate at the time of the image displaying operation can be made different from the frame rate at the time of the image capturing operation. Further, a "Loop playback" checkbox 337 is provided at a lower side of the frame rate display field 336. When the user marks this checkbox, the captured images are played back repeatedly. At a lower side of the "Loop playback" checkbox 337, a playback range setting field 338 is provided for imposing limitation on a playback range. Herein, a start point and an end point of the playback operation are designated by the number of frames. Further, a still-image capturing button 316D and a data saving button 339 for saving data are provided at a lower side of the playback range setting field 338.

In this example, the data of the images captured at a high speed and recorded in the recording screen are retained temporarily. The user views the images on the preview screen, and then determines whether the data is saved. If the data is not saved, data of images to be captured at a high-speed can newly be acquired in the recording screen again. By depression of the data saving button 339, a dialog is displayed for saving the data of the images captured at a high-speed, and the user can save the data in a predetermined folder having a name.

It is needless to say that the layout, shape, display method, size, color, design and the like of the various input fields and buttons are appropriately changeable in these screens. By the change in design, the screen can be enhanced in viewability. Alternatively, evaluation or determination can be made readily or layout readily operable by the user can be designed. In addition, required settings may be made in such a manner that a user inputs various items in a wizard format so as to answer questions. In the foregoing description, the display region, the operation region 310 and the tool bar 320 are displayed on the single screen. However, it is needless to say that any of these regions may be displayed as separate windows, respectively.

(Purpose of Use for Enlargement Observation)

Figure 21:
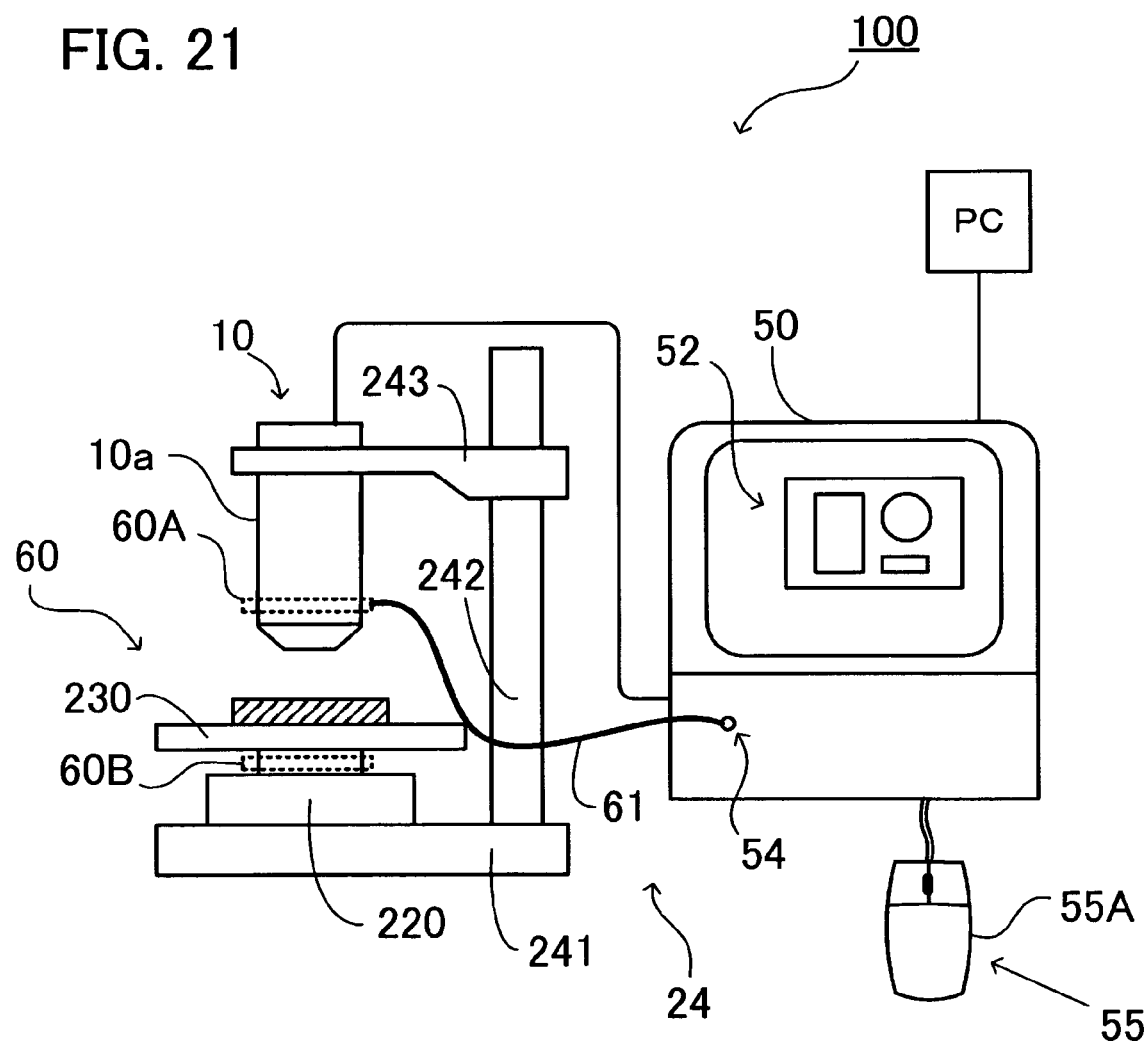
FIG. 21 is an external view showing the image acquisition apparatus according to the embodiment of the present invention.
Figure 22:
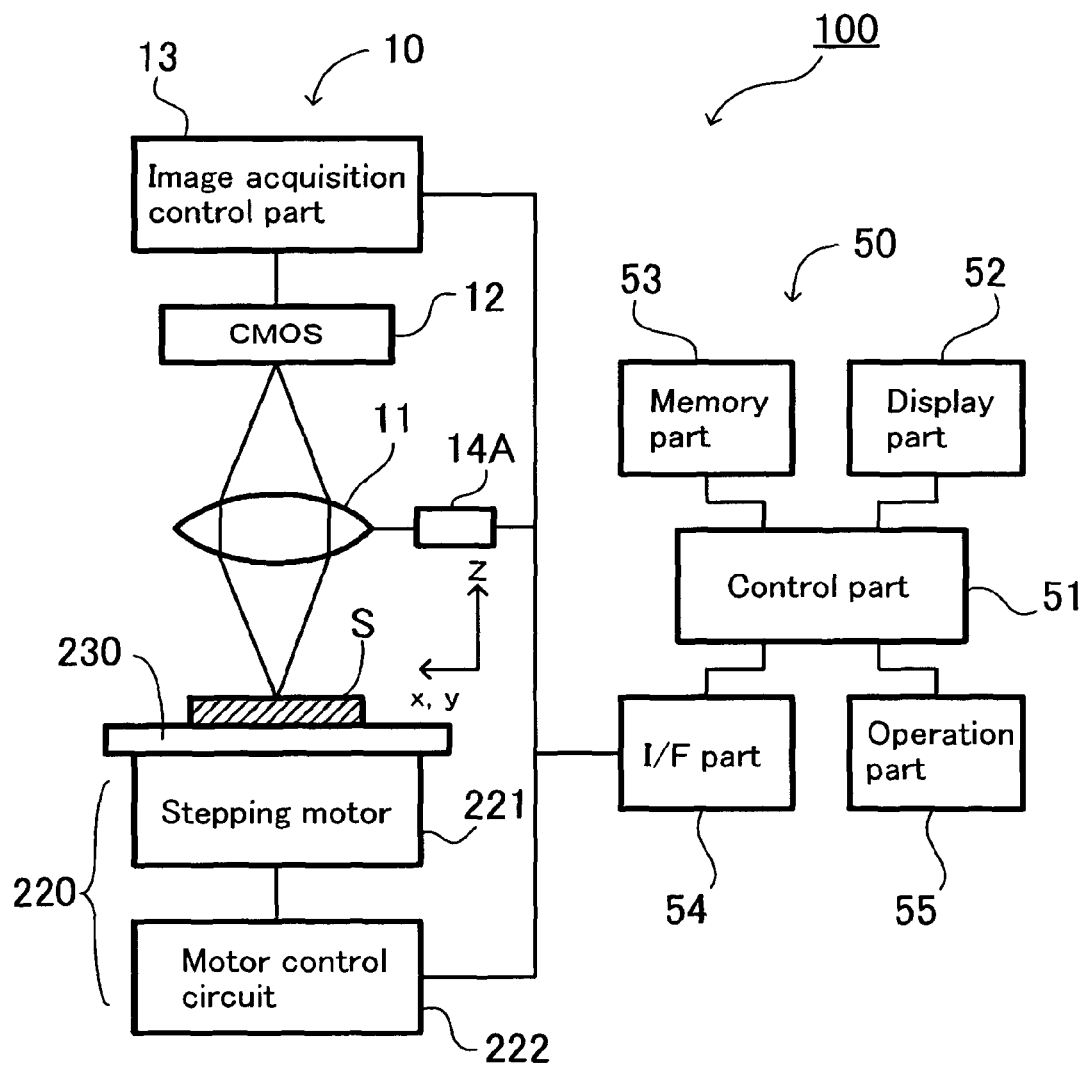
FIG. 22 is a block diagram showing the image acquisition apparatus according to the embodiment of the present invention.

With reference to FIGS. 21 and 22, next, description will be given of the example that the image acquisition apparatus is used for the purpose of use for enlargement observation. In the following, detailed description of members identical to the members, which have been described with reference to FIG. 1 and the like, will not be given. As shown in FIG. 21, the main body section 50 having the display part 52 for displaying an image captured by the image acquisition device 12 is provided in the image acquisition apparatus 100. In the image acquisition apparatus 100 shown in FIG. 22, further, a sample holding part (a stage 230) is provided for holding the object S, the image acquisition device 12 (the CMOS image sensor) is provided for electrically reading light reflected from or transmitting through the object S held by the sample holding part onto which the optical system 11 emits the light, and a focal point adjusting part (a stage lift 220) is provided for changing a relative distance in an optical axis direction between the sample holding part and the optical system 11 to adjust a focal point. As shown in FIG. 22, moreover, the main body section 50 includes a focal length information storage part (the memory part 53) that stores focal length information concerning a relative distance in an optical axis direction between the sample holding part and the optical system 11 at the time when the focal point adjusting part adjusts the focal point, together with two-dimensional position information of the object S in a plane almost perpendicular to the optical direction, the display part 52 that displays an image read by the image acquisition device 12, a region setting part (the operation part 55, a pointing device 55A) that can set at least one of regions of the image displayed by the display part 52, and a calculation part that calculates an average height of the object S in the optical axis direction corresponding to the region set by the region setting part on the basis of the focal length information which concerns an entirety of or a part of the object S corresponding to the region set by the region setting part and is stored in the focal length information storage part. The image acquisition apparatus 100 allows the image acquisition device 12, which electrically reads the light reflected from or transmitting through the object S held by the sample holding part onto which the optical system emits the light, to calculate the average height (depth) of the object S in the optical axis direction corresponding to the designated region.

As shown in FIG. 22, in the image acquisition part 10, the stage 230 is provided as one example of the sample holding part on which the object S is placed, the stage lift 220 moves the stage 230, the CMOS image sensor is provided as one example of the image acquisition device 12 for electrically reading the light reflected from or transmitting through the object S held by the stage 230 through the optical system, for each of the pixels arranged in a two-dimensional form, and the image acquisition control part 13 drives and controls the CMOS image sensor. Further, the image capturing part 10 is connected with the main body section 50. In the main body section 50, the memory part 53 is provided as one example of the image data storage part for storing the image data electrically read by the image acquisition device 12, the display part 52 such as a display or a monitor displays the image based on the image data electrically read by the image acquisition device 12, the operation part 55 accepts various operations such as an input operation on the basis of the screen displayed on the display part 52, and the control part 51 performs various processes such as an imaging process on the basis of the information inputted through the operation part 55. The display that forms the display part 52 is a monitor capable of displaying an image at high resolution. Examples of the display part 52 to be used herein may include a CRT, a liquid crystal panel and the like.

As shown in FIG. 21, a camera 10a has the optical system and the image acquisition device 12, and is attached to a camera attachment part 243 secured to a strut 242 extending from a stand table 241 in a vertical direction. The stand table 241 is provided with the stage lift 220 onto which the stage 230 having the object S placed thereon is attached. Each of the camera 10a and the stage lift 220 is controlled while being connected to the main body section 50. The main body section 50 includes the display part 52 and the operation part 55 such as a mouse. The display part 52 displays an observation image.

Moreover, the main body section 50 is connectable with a computer PC. The main body section 50 may be operated through the computer PC in such a manner that an operating program for enlargement observation is installed to the computer PC. In this specification, the operating program for enlargement observation which is used for operating the main body section 50 through the computer covers an operating program to be installed in a general-purpose or special-purpose computer externally connected to the main body section 50, and an operating program incorporated in a controller in the main body section 50. The main body section 50 incorporates therein an operating function or an operating program for operation of the image acquisition apparatus in advance. This operating program may be updated or may be installed to the main body section 50 in a format of rewritable software such as firmware. In this specification, accordingly, the computer that executes the operating program for enlargement observation covers the image acquisition apparatus itself.

FIG. 22 is a block diagram showing the image acquisition apparatus 100 according to this embodiment of the present invention. The main body section 50 includes the display part 52, the memory part 53 that stores a control program, focal length information, light reception data, two-dimensional information and the like, the interface part 54 for establishing data communications between the main body section 50 and the camera 10a or the stage lift 220, and the operation part 55 that allows the user to operate the image acquisition apparatus. The stage lift 220 includes, for example, a stepping motor 221, and a motor control circuit 222 that controls vertical movement of the stepping motor 221. The image acquisition part 10 includes the light receiving device such as a CMOS image sensor serving as the image acquisition device 12, the image acquisition control part 13 for driving and controlling the CMOS image sensor, and the optical system 11 for forming an image on the CMOS image sensor from light emitted from the illuminating part 60 and, then, reflected from or transmitting through the object S placed on the stage 230.

The image acquisition part 10 may further include the pixel shifting part 14 for obtaining a high resolution exceeding the resolution of the CMOS image sensor by pixel shifting. In FIG. 22, an optical path shift part 14A optically shifts an optical path of the light, which is reflected from or transmits through the object S placed on the stage 230 and, then, is made incident on the CMOS image sensor through the optical system 11, in at least one direction at a distance smaller than a pitch of one pixel in the CMOS image sensor in this direction. In one embodiment of the present invention, a mechanism or a method for realizing the pixel shifting is not limited to the configuration described above. For example, an existing method or a method which will be developed in future may be used appropriately.

The main body section 50 inputs, to the motor control circuit 222, control data about control of the stepping motor 221 to change the relative distance in the optical axis direction between the stage 230 serving as the sample holding part and the camera 10a having the optical system 11 and the CMOS image sensor serving as the image acquisition device 12, that is, a height in a "z" direction in this embodiment. More specifically, the main body section 50 inputs, to the motor control circuit 222, the control data required for control of the stage lift 220 to control the rotation of the stepping motor 221, and changes the height z of the stage 230 (the position in the "z" direction). The stepping motor 221 generates a rotation signal in accordance with the rotation. The main body section 50 stores the height z of the stage 230 as information about the relative distance in the optical axis direction between the sample holding part and the optical system 11, on the basis of the rotation signal received through the motor control circuit 222. This stage functions as an observation position determining part for determining an observation position for the object S. In this embodiment, as an example, by the change in height of the stage 230, the relative distance in the optical axis direction between the sample holding part and the optical system is changed. Herein, alternatively, the height of the optical system 11, for example, the height of the camera 10a may be changed with the stage 230 being secured. The stage may be provided at the main body section 50. Alternatively, the stage may be provided at the image acquisition module 16 provided independently of the main body section, or the image acquisition part having no stage may be provided at the image acquisition module 16. The image acquisition part having no stage may be attached to an attachment stand or may be handheld by the user. The image acquisition module 16 described above is connected to the main body section 50 through the cable section 24.

The CMOS image sensor can electrically read a quantity of received light for each of the pixels arranged in a two-dimensional form (in an "x" direction and a "y" direction). The image of the object S, which is formed on the CMOS image sensor, is converted to an electric signal in accordance with the quantity of received light by the respective pixels in the CMOS image sensor. Then, the electric signal is converted to digital data by the image acquisition control part 13. The main body section 50 allows the memory part 53 to store the digital data converted by the image acquisition control part 13 as light reception data D, in addition to arrangement information (x,y) of the pixel as two-dimensional position information of the object in a plane (the "x,y" direction in FIG. 22) almost perpendicular to the optical axis direction (the "z" direction in FIG. 22). Herein, the plane almost perpendicular to the optical axis direction is not necessarily a plane that strictly forms an angle of 90° relative to the optical axis direction. Preferably, the plane is an observation surface within a range of tilting to a degree that the shape of the object can be recognized at a resolution of the optical system or the image acquisition device 12.

In the foregoing embodiment, moreover, the example that the object is placed on the stage is described as one example of the sample holding part. For example, the object may be secured to a tip end of an arm provided in place of the stage. Further, the camera 10a is used while being attached to the camera attachment part 243. In addition, the camera 10a may be disposed at a desired position and a desired angle by a removable handheld method.

The illuminating part 60 shown in FIG. 21 includes the epi-illumination source 60A for emitting epi-illumination light to the object S, and the transmission illumination source 60B for emitting transmission light to the object S. The epi-illumination source 60A is connected to the main body section 50 through the illumination light supply cable 61. The main body section 50 includes a connector for connection of the illumination light supply cable 61. Further, the main body section 50 incorporates therein the illumination light source 64 (not shown in FIG. 21) for sending light to the illumination light supply cable 61 through the connector.

As described above, the high-speed image capturing function is added to a conventional image acquisition apparatus to enhance general versatility of the image acquisition apparatus. For example, the image acquisition apparatus can also be used for diagnosing a cause of a malfunction, and the like. Therefore, convenience of the image acquisition apparatus is improved. Further, the image acquisition apparatus can be used without preparation of a high-speed image pickup camera or an illumination source that has conventionally been prepared. Thus, a high-speed image capturing operation can be realized at low cost. In addition, management and maintenance for the image acquisition apparatus can also be performed readily. As a result, the present invention allows realization of an image acquisition apparatus at lower cost with higher efficiency.

The image acquisition apparatus according to the present invention can be suitably used as a digital microscope or a digital camera of a reflection type, a transmission type or the like. The image acquisition apparatus according to the present invention can also be suitably used as a high-speed image acquisition apparatus, such as a high-speed camera or a high-speed video camera, that successively captures, in a short time, images of a high-speed event such as a diagnosis of a cause of a malfunction in a FA line, a material breakage, e.g., observation of a state that a material is broken in a tensile test, high-speed combustion of an internal combustion engine, a motion behavior in a sport, a collision, or an electric discharge.

What is claimed is:

1. An image acquisition apparatus for capturing an image of an observation target, comprising:
   a head section configured to include
      an image acquisition module that incorporates therein an image acquisition part for capturing an image,
      a lens module that is connected to the image acquisition module and incorporates therein an optical lens optically coupled to the image acquisition part, and
      an illuminating part that illuminates an observation target of an image formed on the image acquisition part through the lens module;
   a main body section configured to include
      an illumination light source that supplies illumination light to the illuminating part,
      an image acquisition control part that generates an image acquisition control signal for controlling the image acquisition part and, then, transmits the image acquisition control signal to the image acquisition part, and an image processing part that performs an imaging process on an enlarged image captured by the image acquisition part; and a cable section configured to include an illumination light supply cable that connects between the illumination light source in the main body section and the illuminating part in the head section and supplies the illumination light from the illumination light source to an observation target region through the lens module, and a signal transmission cable that transmits the image acquisition control signal from the image acquisition control part in the main body section to the image acquisition part in the head section and, also, transmits an image signal from the image acquisition part to the image processing part in the main body section, the cable section being configured to connect between the main body section and the head section, wherein the lens module is one of a first lens module incorporating therein an optical lens for high-speed observation and a second lens module incorporating therein an optical lens for enlargement observation, which is selectively attached to the head section, and said second lens module has an illumination optical path at an inside of said lens module and said first lens module has an attachable illumination unit at an outside of said lens module and said attachable illumination unit has at least one mechanism that is either an illumination unit tilt angle adjusting mechanism for adjusting a tilt angle of the first lens illumination unit relative to the first lens module or a diameter of spot light adjusting mechanism for adjusting a diameter of spot light projected from said illumination unit, and in a case where the first lens module is attached to the head section, the illuminating part is a first lens illumination unit that adjusts a working distance of illumination light for illuminating a region of which an image is captured by the first lens module, the first lens illumination unit being attached to the head section.

2. The image acquisition apparatus according to claim 1, wherein in a case where the second lens module is attached to the head section, the illuminating part is a coaxial epi-illumination adapter that emits illumination light which is substantially coaxial with the optical lens of the second lens module, the coaxial epi-illumination adapter being attached to the head section.

3. The image acquisition apparatus according to claim 1, wherein the head section has at least a part of an outer periphery formed into a columnar shape, and the first lens illumination unit is attached to the head section so as to freely rotate on the columnar-shaped outer periphery of the head section.

4. The image acquisition apparatus according to claim 1, wherein the illumination unit tilt angle adjusting mechanism includes a worm gear secured at a side of the head section, and a worm wheel secured at a side of the first lens illumination unit.

5. The image acquisition apparatus according to claim 1, wherein the illumination light source is attached to the main body section, and the main body section further includes a light source determining part that determines a type of the attached illumination light source.

6. The image acquisition apparatus according to claim 5, wherein the illumination light source is one of a first light source and a second light source lower in illuminance than the first light source and higher in color rendering than the first light source, which is selectively attached to the main body section.

7. The image capturing apparatus according to claim 6, wherein each of the first light source and the second light source is a metal halide lamp, and the second light source is higher than the first light source in terms of a color component of red light.

8. The image acquisition apparatus according to claim 6, wherein the first light source is one of a metal halide lamp, a mercury lamp and a xenon lamp, and the second light source is one of a metal halide lamp, a halogen lamp and an LED illumination source.

9. The image acquisition apparatus according to claim 1, wherein in the main body section, at least one of the illumination light source, the image acquisition control part and the image processing part is divided on a unit basis.

10. The image acquisition apparatus according to claim 1, further comprising an optical-coupling correcting part that corrects an incident angle of the light, which is emitted from the illumination light source and, then, is received at an end face of the illumination light supply cable, where a traveling direction of the illumination light from the illumination light source coincides with an optical axis direction of the illumination light supply cable in an optical coupling surface between the illumination light source and the illumination light supply cable.

11. The image acquisition apparatus according to claim 10, wherein the optical-coupling correcting part is a plano convex lens, and the plano convex lens is arranged such that a flux of the light emitted from the illumination light source partly passes through a front-side focal point of the plano convex lens.

12. The image acquisition apparatus according to claim 1, wherein the signal transmission cable and the head section are integrally connected to each other.

13. The image acquisition apparatus according to claim 1, wherein the illumination light supply cable is a plurality of glass fibers.

14. The image acquisition apparatus according to claim 1, wherein the illumination optical path incorporated in the second lens module is a ring-shaped illumination source.

15. The image acquisition apparatus according to claim 14, wherein in the case where the second lens module is attached to the head section, the illumination light supply cable is connected to a connection terminal of the head section and, then, is connected to the illumination optical path formed in the second lens module through the head section.

16. The image acquisition apparatus according to claim 14, wherein
in the case where the first lens module is attached to the head section, the illumination light supply cable is connected to a connection terminal of the second lens module.

17. The image acquisition apparatus according to claim 1, wherein
the illumination light supply cable is directly connected to the lens module in the head section.

18. The image acquisition apparatus according to claim 1, wherein the diameter of the spot light adjusting mechanism comprises a telescope-type lens having a movable cylindrical lens portion to adjust the diameter of the spot light.

19. The image acquisition apparatus according to claim 1, wherein the diameter of the spot light adjusting mechanism comprises a plurality of optical lenses being made movable inside the first lens illumination unit.

* * * * *